(12) United States Patent
Akimoto et al.

(10) Patent No.: US 8,886,850 B2
(45) Date of Patent: Nov. 11, 2014

(54) INFORMATION PROCESSING APPARATUS AND COMPUTER-READABLE RECORDING MEDIUM FOR DISPLAYING INDICATION OF INSERTION OR WITHDRAWAL OF AN ELECTRONIC DEVICE

(75) Inventors: Masao Akimoto, Tokyo (JP); Chohiko Fukuoh, Tokyo (JP); Shuichi Kawashima, Tokyo (JP)

(73) Assignee: Konica Minolta Business Technologies, Inc. (JP)

( * ) Notice: Subject to any disclaimer, the term of this patent is extended or adjusted under 35 U.S.C. 154(b) by 75 days.

(21) Appl. No.: 13/485,603

(22) Filed: May 31, 2012

(65) Prior Publication Data

US 2012/0311196 A1    Dec. 6, 2012

(30) Foreign Application Priority Data

May 31, 2011   (JP) ................................. 2011-122077

(51) Int. Cl.
*G06F 3/00*  (2006.01)
*G06F 3/0481*  (2013.01)

(52) U.S. Cl.
CPC .................................. *G06F 3/04817* (2013.01)
USPC ............................................... 710/15; 710/16

(58) Field of Classification Search
None
See application file for complete search history.

(56) References Cited

U.S. PATENT DOCUMENTS

2004/0032394 A1    2/2004  Ayatsuka et al.
2006/0077424 A1    4/2006  Maruta et al.

FOREIGN PATENT DOCUMENTS

| JP | 05-289838 | 11/1993 |
| JP | 2001-175118 | 6/2001 |
| JP | 2004-054879 | 2/2004 |
| JP | 2006-107377 | 4/2006 |
| JP | 2010-154317 | 7/2010 |

OTHER PUBLICATIONS

Notice of Reason for Refusal for appl. No. JP 2011-122077, mailed Aug. 6, 2013, 3 pgs.
Translation of the Notice of Reason for Refusal for appl. No. JP 2011-122077, mailed Aug. 6, 2013, 5 pgs.

*Primary Examiner* — Farley Abad
*Assistant Examiner* — David Martinez
(74) *Attorney, Agent, or Firm* — Squire Patton Boggs (US) LLP

(57) ABSTRACT

Disclosed is an information processing apparatus including: a display unit; a connection I/F unit to receive a connection to a withdrawable electronic device; and a control unit to detect an insertion operation or a withdrawal operation; wherein when the control unit detects the insertion operation, the control unit instructs the display unit to display contents corresponding to the electronic device connected to the connection I/F unit by the insertion operation so as to move the contents in a direction which is same as a direction of the detected insertion operation, and when the control unit detects the withdrawal operation, the control unit instructs the display unit to display the contents corresponding to the electronic device withdrawn from the connection I/F unit by the withdrawal operation so as to move the contents in a direction which is same as a direction of the detected withdrawal operation.

22 Claims, 20 Drawing Sheets

FIG.6C
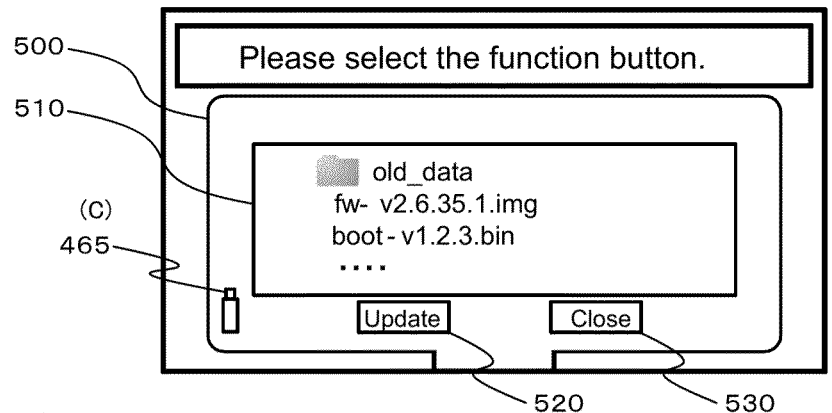
FIG.6B
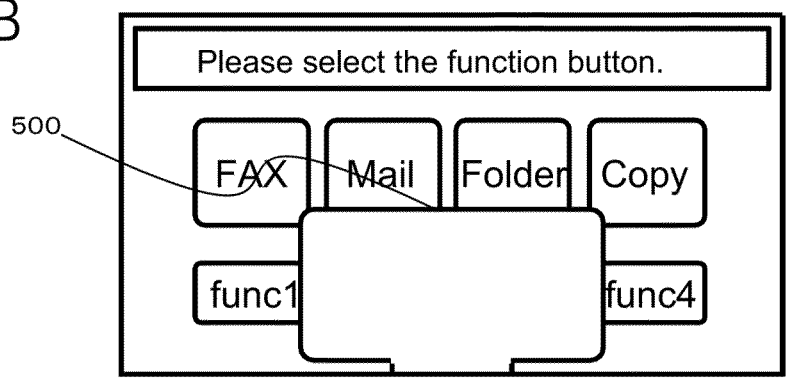
FIG.6A
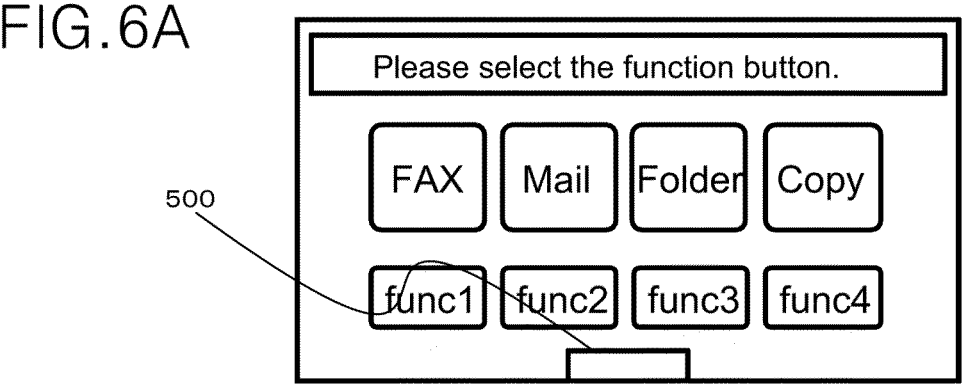
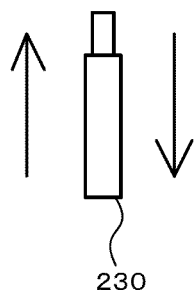

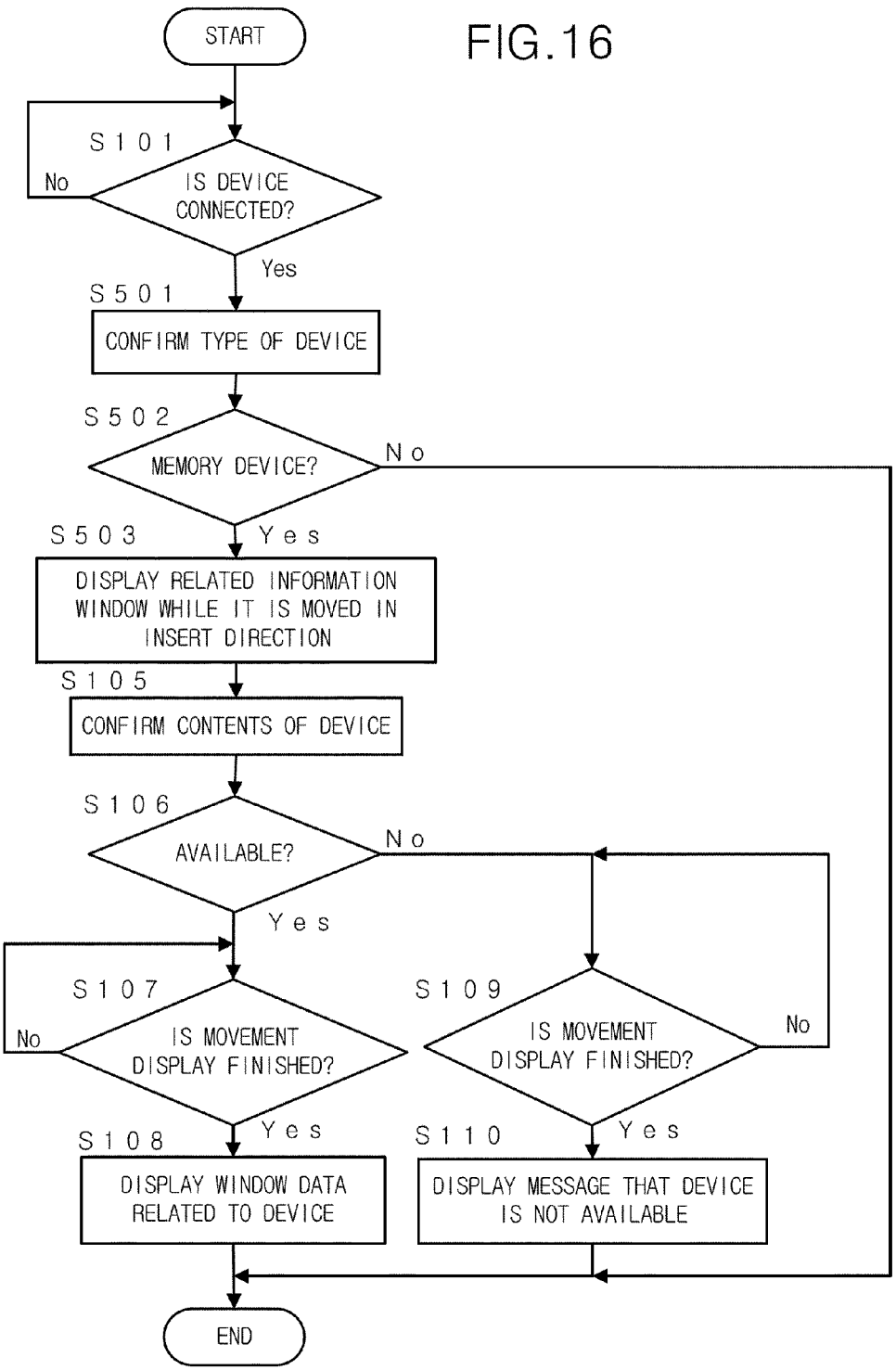

BEFORE USB MEMORY IS CONNECTED

AT THE TIME OF CONNECTING USB MEMORY

BEFORE USB MEMORY IS DETACHED

INFORMATION PROCESSING APPARATUS AND COMPUTER-READABLE RECORDING MEDIUM FOR DISPLAYING INDICATION OF INSERTION OR WITHDRAWAL OF AN ELECTRONIC DEVICE

BACKGROUND OF THE INVENTION

1. Field of the Invention

The present invention relates to an information processing apparatus and a tangible computer-readable recording medium, in particular, an information processing apparatus comprising an electronic device connection I/F unit for receiving the connection of an electronic device and a tangible computer-readable recording medium which stores a program therefor.

2. Description of Related Art

In recent years, the functions of the information processing apparatus have been diversified. As one of the functions of the information processing apparatus, when an external recording medium (external memory) is connected to the information processing apparatus, the storage capacity of the external memory can be used as a part of the storage capacity of the information processing apparatus. As a standard of an interface for transferring data between the information processing apparatus and a peripheral equipment, for example, the USB (Universal Serial Bus) interface standard has been known.

A product which is compliant with the USB interface standard can carry out the data communication with the information processing apparatus by connecting the USB connector provided in the product to the information processing apparatus. Therefore, when a user connects a memory (referred to as "USB memory") which is compliant with the USB interface standard, to the information processing apparatus, the USB memory is mounted on the information processing apparatus and files and data which are stored in the USB memory can be used.

The information processing apparatus which prompts a user to confirm whether to read out files and data stored in the USB memory, on the operation window when the USB memory is connected to the information processing apparatus, is disclosed (See Japanese Patent Application Publication No. 2006-107377).

For example, in the image forming apparatus disclosed in the above Japanese Patent Application Publication, when the USB memory is attached to the image forming apparatus, the image forming apparatus displays the message indicating that the user can use the files and the like stored in the USB memory, and the icon indicating that the USB memory is attached to the image forming apparatus. When the user carries out the menu operation, the file list of the flies stored in the USB memory is displayed.

FIG. 18 shows an example of the display window which is displayed when the USB memory is attached to a general image forming apparatus. In the display window 900 shown in FIG. 18, the message "EXTERNAL MEMORY IS CONNECTED. [EXTERNAL MEMORY] CAN BE USED FROM [SYSTEM] OF BOX FUNCTION." is displayed. Further, in a task bar, the icon 960 indicating that the USB memory can be used is displayed.

FIG. 19 is the display window 910 showing the file list of the files stored in the USB memory which is attached to a general image forming apparatus. In the file list, each file name of the files stored in the USB memory and each updated date thereof are displayed. The user can print out or access to an optional file by selecting the file from the file list. The icon 960 displayed in the task bar indicates that the USB memory is currently connected to the image forming apparatus.

FIGS. 20A, 20B and 20C show the task bar displayed in a general information processing apparatus. In a general information processing apparatus, by displaying the icon, the user is informed that the USB memory is connected. For example, the task bar 920 shown in FIG. 20A shows the situation prior to the connection of the USB memory. In the situation prior to the connection of the USB memory, the icon indicating that the USB memory is connected is not displayed in the task bar 920. The task bar 930 shown in FIG. 20B shows the situation in which the USB memory is connected to the information processing apparatus. In the task bar 930, the icon 940 indicating that the USB memory is connected to the information processing apparatus is displayed.

In this situation, in case that the USB memory is detached from the information processing apparatus, the user moves a pointer to the icon 940 by using a mouse and clicks the icon by using a left button of the mouse. When the icon 940 is clicked, the list of the connected USB memories is displayed. By selecting the USB memory to be detached by the user from the list, it is possible to detach the selected USB memory from the information processing apparatus. The task bar 970 shown in FIG. 20C informs the user that the selected USB memory is detachable from the information processing apparatus. The task bar 970 displays the message indicating that the USB memory can be detached from the information processing apparatus, near the icon 950.

In the information processing apparatus disclosed in above Japanese Patent Application Publication, by displaying the predetermined icon in the task bar, the user is informed that the USB memory is connected. Therefore, when the user connected an external memory to an external memory I/F unit, it was difficult for the user to recognize which external memory I/F unit the external memory was connected to among a plurality of external memory I/F units. When the user detached an external memory from the external memory I/F unit, it was difficult for the user to recognize which external memory I/F unit the external memory was detached from among a plurality of external memory I/F units. Further, although the external memory can be selected by displaying a list of the external memories connected to the external memory I/F units, it was difficult for the user to intuitively recognize which I/F unit of the information processing apparatus the external memory was connected to.

SUMMARY

To achieve at least one of the abovementioned objects, an information processing apparatus reflecting one aspect of the present invention comprises:

a display unit;

a connection I/F unit to receive a connection to a withdrawable electronic device; and a control unit to detect an insertion operation in which the electronic device is inserted into the connection I/F unit by a user or a withdrawal operation in which the electronic device is withdrawn from the connection I/F unit by the user;

wherein the control unit carries out at least one display of an insertion display and a withdrawal display, wherein in the insertion display, when the control unit detects the insertion operation, the control unit instructs the display unit to display contents corresponding to the electronic device connected to the connection I/F unit by the insertion operation so as to move the contents in a direction which is same as a direction of the detected insertion operation, and in the withdrawal display, when the control unit detects the withdrawal operation, the control unit instructs the display unit to display the contents corresponding to the electronic device withdrawn from the connection I/F unit by the withdrawal operation so as to move the contents in a direction which is same as a direction of the detected withdrawal operation.

Preferably, the control unit detects the insertion operation by one of detecting that the electronic device is connected to the connection I/F unit, recognizing that the electronic device connected to the connection I/F unit is an external memory, and recognizing a type of data stored in the external memory connected to the connection I/F unit.

Preferably, when the control unit detects the withdrawal operation, the control unit instructs the display unit to delete the contents corresponding to the electronic device withdrawn from the connection I/F unit by the withdrawal operation while the contents are moved in a same direction as a direction in which the electronic device is withdrawn from the connection I/F unit.

Preferably, the control unit instructs the display unit to display a display indication indicating a direction in which the electronic device is connected to the connection I/F unit, and a type of the electronic device, with the contents.

Preferably, when the control unit receives an operation for temporarily hiding the contents, the control unit instructs the display unit to delete the contents to be hidden by the operation while the contents are moved in a same direction as a direction in which the electronic device corresponding to the contents to be hidden is withdrawn from the connection I/F unit and instructs the display unit to display a corresponding indication indicating a direction in which the electronic device corresponding to the deleted contents is connected to the connection I/F unit and a type of the electronic device, and when the control unit detects an operation for selecting the corresponding indication, the control unit instructs the display unit to display the contents of the electronic device corresponding to the selected corresponding indication again while the contents are moved in a same direction as a direction in which the electronic device corresponding to the corresponding indication is inserted into the connection I/F unit.

Preferably, when the electronic device is an external memory, the control unit instructs the display unit to display a type of data stored in the external memory, in the contents corresponding to the external memory.

Preferably, the connection I/F unit is provided near the display unit.

Preferably, after a movement of the contents, which is caused by the insertion operation is finished, the control unit instructs the display unit to display the contents by biasing the contents so that the contents contact to a side of the display unit, which is positioned at a starting point of moving the contents in a direction in which the electronic device is inserted into the connection I/F unit.

Preferably, when the control unit detects the insertion operation, the control unit instructs the display unit to move the contents corresponding to the electronic device so as to slide the contents in a screen of the display unit, and when the control unit detects the withdrawal operation, the control unit instructs the display unit to move the contents so as to slide the contents out of the screen, or when the control unit detects the insertion operation, the control unit instructs the display unit to display the contents by a pop-up, and when the control unit detects the withdrawal operation, the control unit instructs the display unit to close the contents while the contents are moved, or when the control unit detects the insertion operation, the control unit instructs the display unit to move the contents by zooming in the contents, and when the control unit detects the withdrawal operation, the control unit instructs the display unit to move the contents by zooming out the contents.

BRIEF DESCRIPTION OF THE DRAWINGS

The present invention will become more fully understood from the detailed description given hereinafter and the accompanying drawings given by way of illustration only, and thus are not intended as a definition of the limits of the present invention, and wherein:

FIGS. 6A to 6C are examples of the display contents in case that the USB memory is inserted into and withdrawn from the external memory I/F unit provided on the lower side of the liquid crystal display unit, in the up-and-down direction;

FIG. 16 is a flowchart showing the process since the device is inserted into the external memory I/F unit until the related information window is displayed after the CPU judges that the connected device is a memory device;

DETAILED DESCRIPTION OF PREFERRED EMBODIMENTS

Hereinafter, a preferred embodiment of the present invention will be explained with reference to the accompanying drawings.

First Embodiment

Figure 1:
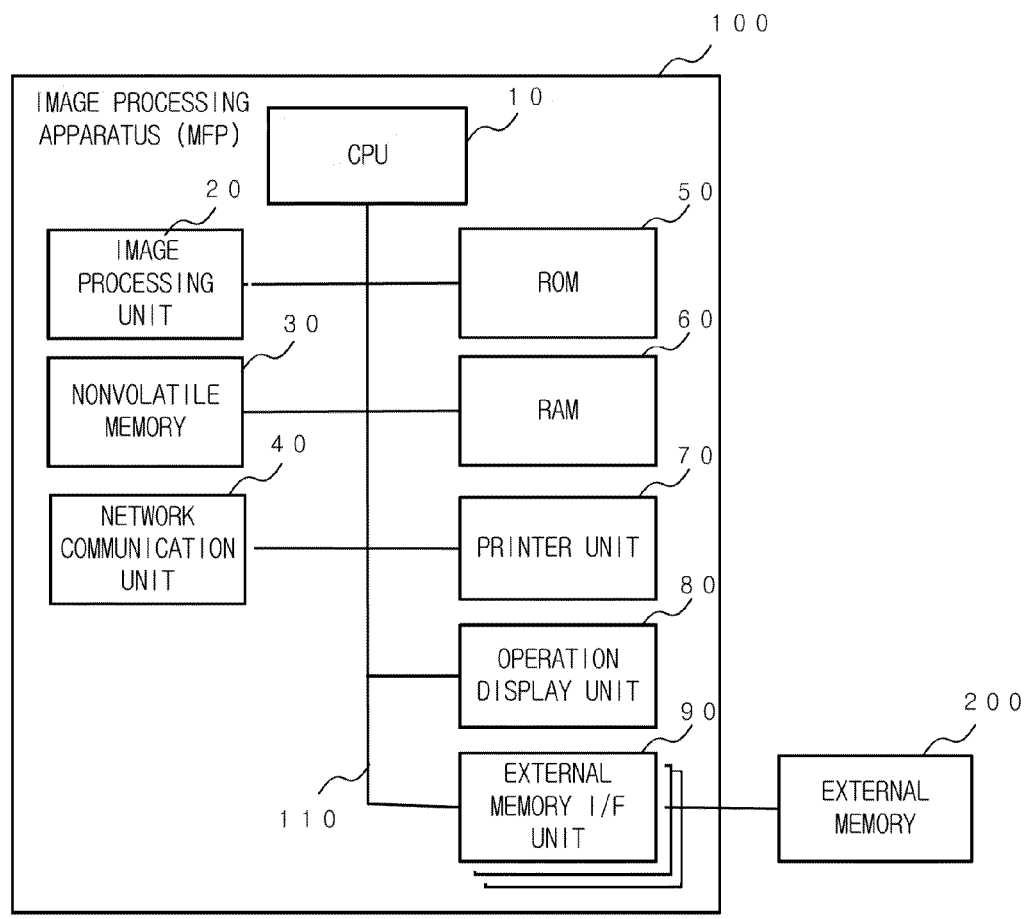
FIG. 1 is a block diagram of an image processing apparatus (MFP) according to the first embodiment.

FIG. 1 shows a block diagram of an image processing apparatus (MFP) 100 according to the first embodiment of the present invention. The image processing apparatus 100 has a function to receive the connection of an external memory (electronic device) 200 and to execute the print process for a file or data stored in the connected external memory 200.

The image processing apparatus 100 shown in FIG. 1 comprises a CPU (Central Processing Unit) 10 for controlling the whole operation of the image processing apparatus 100 and the execution of various jobs, an image processing unit 20, a nonvolatile memory 30, a network communication unit 40, a ROM (Read Only Memory) 50, a RAM (Random Access Memory) 60, a printer unit 70, an operation display unit 80, a plurality of external memory I/F (Interface) units 90 and the like. The CPU 10 is connected to all of the above elements via an internal bus 110.

The image processing unit 20 is controlled by the CPU 10. For example, the image processing unit 20 carries out the rasterization processing for converting print data into image data, compression/decompression processing of image data and the like, in addition to the processings, such as enlargement/reduction and rotation of the image.

The nonvolatile memory 30 is a memory (flash memory) in which the stored contents are not damaged even if the image processing apparatus 100 is turned off. In the nonvolatile memory 30, the user information, various setting values and the like are stored.

The network communication unit 40 transmits and receives various types of data to/from external devices, such as an external information processing apparatus (not shown) or an external server (not shown) via a LAN (Local Area Network). For example, the network communication unit 40 receives data (files) from the external information processing apparatus via the LAN.

In the ROM 50, various types of programs are stored. The CPU 10 executes the processes in accordance with these programs. As a result, various types of functions of the image processing device 100, such as the execution of jobs, are realized. The RAM 60 is used as a work memory for temporarily storing various data when the CPU 10 executes the programs and as an image memory for storing image data.

The printer unit 70 has a function to form an image on print paper in accordance with image data. In the present embodiment, the printer unit 70 is configured as the so-called laser printer for forming the image by the electrophotographic process. The laser printer comprises a photoconductive drum, a charging device, a laser unit, a developing device, a transfer device, a separation device, a cleaning device and a fixing unit. In the printer unit 70, other types may be adopted.

The operation display unit 80 comprises a display unit and an operating unit. The display unit comprises a liquid crystal display (LCD) and the like, and has a function to display various types of operation windows, setting windows and the like. The operating unit has a function to receive various types of operations, such as the jobs or the settings from the users. The operating unit comprises a touch panel which is provided on the screen of the display unit. The touch panel detects a coordinate position in which the user pushes down. Further, the operating unit comprises a numerical keypad, an alphabetical keypad, a start key and the like. In the operation display unit 80, the physical display part for displaying various display windows is referred to as the liquid crystal display unit 300.

The external memory I/F unit (connection I/F unit) 90 is configured by connection ports or connection terminals for connecting the external memory 200, such as a USB (Universal Serial Bus) memory, an SD (Secure Digital) memory card and the like, to the image processing apparatus 100, and an interface circuit for receiving and transmitting the data from/to the connected electronic device. Further, the external memory I/F unit 90 comprises a plurality of types of connection ports or connection terminals in order to match a plurality of types of external memories, such as a memory which is compliant with USB interface standard, an SD memory card.

In this embodiment, the external memory I/F unit 90 is provided near the operation display unit 80 (on the periphery of the liquid crystal display unit 300). For example, four connection terminals of the USB memory are provided on the periphery of the liquid crystal display unit 300. Two of the above connection terminals are provided on the right side of the liquid crystal display unit 300, and the other two are provided on the lower side and the lower right side of the liquid crystal display unit 300, respectively.

In one of the connection terminals of USB memory, which are provided on the right side of the liquid crystal display unit 300, the USB memory is inserted in the left direction from the right of the connection terminal and is withdrawn in the right direction from the connection terminal as the drawings are viewed from above. In the other of the connection terminals of the USB memory, which are provided on the right side of the liquid crystal display unit 300, the USB memory is inserted in the upper direction from the lower side of the connection terminal, and is withdrawn in the lower direction from the connection terminal as the drawings are viewed from above. Further, in the connection terminal of the USB memory, which is provided on the lower side of the liquid crystal display unit 300, the USB memory is inserted in the upper direction from the lower side of the connection terminal, and is withdrawn in the lower direction from the connection terminal as the drawings are viewed from above. In the connection terminal of the USB memory, which is provided on the lower right side of the liquid crystal display unit 300, the USB memory is inserted in the upper direction from the lower side of the connection terminal, and is withdrawn in the lower direction from the connection terminal as the drawings are viewed from above.

Further, in this embodiment, the connection terminal of the SD card is provided. The connection terminal of the SD card is provided on the left side of the liquid crystal display unit 300. In the connection terminal of the SD card, the SD card is inserted in the right direction from the left of the connection terminal, and is withdrawn in the left direction from the connection terminal. The ID (Identification) assigned to each external memory I/F unit 90, the position information of each external memory I/F unit 90 corresponding to the ID, the information relating to the direction of the connection terminal of each external memory I/F unit 90 corresponding to the ID are previously registered in a device table stored in the nonvolatile memory 30.

Summary Explanation of the First Embodiment

In the first embodiment, when the CPU 10 detects the insertion operation in which the external memory 200 is inserted into the external memory I/F unit 90 or the withdrawal operation in which the external memory 200 is withdrawn from the external memory I/F unit 90, the CPU 10 instructs the operation display unit 80 (the liquid crystal display unit 300) to display the window (referred to as a related information window (contents)) relating to the external memory 200 connected to the external memory I/F unit 90 or the external memory 200 withdrawn from the external memory I/F unit 90 so as to move the window in the same direction as the direction of the insertion/withdrawal operation. Here, the insertion/withdrawal operation means that the insertion operation in which the external memory 200 is inserted into the external memory I/F unit 90 or the withdrawal operation in which the external memory 200 is withdrawn from the external memory I/F unit 90 is carried out.

This embodiment is explained by exemplifying the case in which the image processing apparatus 100 is used. However, the embodiment is not limited to this as long as the information processing apparatus comprises the CPU 10, the operation display unit 80 and a plurality of external memory I/F units 90 and the like.

<Movement Display in the Insertion/Withdrawal Operation of the USB Memory>

Figure 2A:
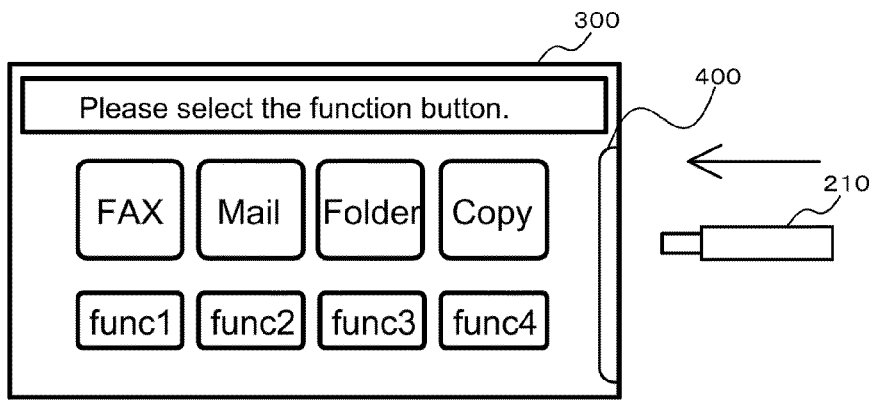
FIGS. 2A to 2C are examples of the display contents in case that the insert direction of the USB memory is from right to left, the withdrawal direction of the USB memory is from left to right, and the USB memory is inserted into and withdrawn from the external memory I/F unit.
Figure 2B:
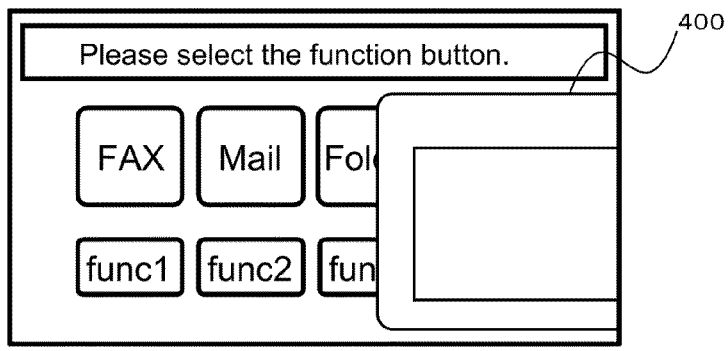
Figure 2C:
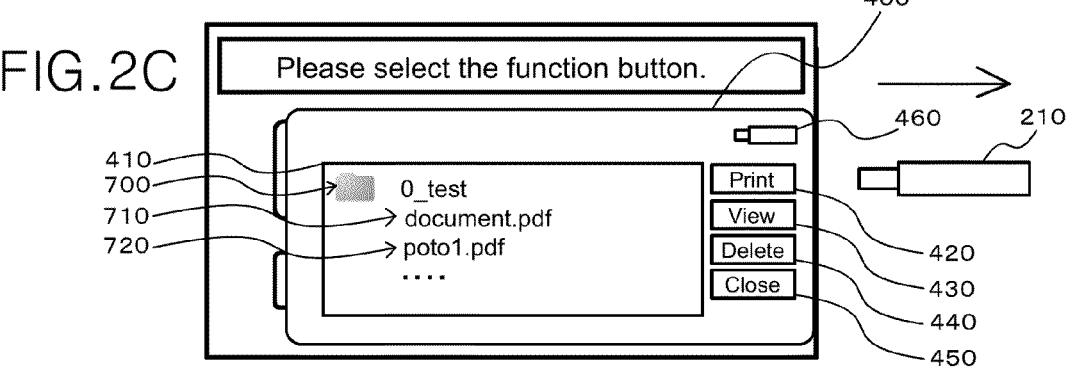

FIGS. 2A to 2C are examples of the display contents in case that the insert direction of the USB memory 210 is from right to left, the withdrawal direction of the USE memory 210 is from left to right, and the USB memory 210 is inserted into and withdrawn from the external memory I/F unit 90. In FIGS. 2A to 2C, when the USB memory 210 is inserted into the external memory I/F unit 90 in the left direction from the right of the external memory I/F unit 90, the CPU 10 detects that the USE memory 210 is inserted into this external memory I/F unit 90 and specifies the ID assigned to this external memory I/F unit 90. Then, in accordance with the specified ID, the CPU 10 obtains the information relating to the direction of the connection terminal of this external memory I/F unit 90 from the device table stored in the nonvolatile memory 30. Further, when the CPU 10 detects the connection of the USB memory 210 to the external memory I/F unit 90, the CPU 10 generates the related information window corresponding to the USB memory 210 of which the connection is detected, and assigns the ID to the generated related information window. The CPU 10 relates the ID of the external memory I/F unit 90 to which the connection of the USB memory 210 is detected to the ID of the generated related information window 400 and stores them in the nonvolatile memory 30.

The CPU 10 instructs the operation display unit 80 to display the related information window 400 corresponding to the ID of the related information window, which is related to the ID of this external memory I/F unit 90, so as to slide the related information window 400 in the liquid crystal display unit 300 (referred to as slide-in) by moving it from right to left in the direction in which the USB memory 210 is inserted into this external memory I/F unit 90 in accordance with the information relating to the direction of the connection terminal of the external memory I/F unit 90, which is obtained from the device table. Then, when the user withdraws the USB memory 201 from the external memory I/F unit 90, the CPU 10 instructs the operation display unit 80 to delete the related information window 400 so as to slide it out of the liquid crystal display unit 300 (referred to as slide-out) from left to right. The external memory I/F unit 90 into which the USB memory 210 is inserted is provided on the right side of the liquid crystal display unit 300.

The slide-in means the display form in which, for example, in case that the USB memory 210 is inserted from the right to left, the related information window 400 is displayed so as to appear in the liquid crystal display unit 300 while the related information window 400 is moved in the left direction from the right end of the liquid crystal display unit 300. On the other hand, the slide-out means the display form in which, for example, incase that the USB memory 210 is withdrawn from left to right, the related information window 400 is displayed so as to delete it while the related information window 400 is moved on the liquid crystal display unit 300 in the right direction and is pulled into the right end of the liquid crystal display unit 300.

The slide direction of the slide-in is the direction in which the USB memory 210 is inserted into the external memory I/F unit 90. The slide direction of the slide-out is the direction in which the USB memory 210 is withdrawn from the external memory I/F unit 90.

To be more specific about FIGS. 2A to 2C, FIG. 2A shows that the USB memory 210 is inserted into the external memory I/F unit 90 in the left direction from the right of the external memory I/F unit 90. When the USB memory 210 is connected to the external memory I/F unit 90, the CPU 10 starts the display of the related information window 400 corresponding to the USB memory 210. In FIG. 2A, the related information window 400 starts to appear from the right end of the liquid crystal display unit 300.

FIG. 2B shows that the slide-in of the related information window 400 from the right end of the liquid crystal display unit 300. In the related information window 400, the folder names and the file names of which the folders and the files are stored in the USB memory 210, are not displayed.

FIG. 2C shows the state in which the movement of the related information window 400 on the liquid crystal display unit 300 is finished and the related information window 400 is stopped. The CPU 10 instructs the operation display unit 80 to display the related information window 400 by stopping the related information window 400 so that the right end portion of the related information window 400 contacts to the right side of the liquid crystal display unit 300 and the related information window 400 is biased to the right side of the liquid crystal display unit 300 at the time of finishing the slide-in. When the CPU 10 finishes the movement of the related information window 400, the data (information display area 410) relating to the USB memory 210 are displayed in the related information window 400.

Further, in the related information window 400 shown in FIG. 2C, the information display area 410, a print button 420, a view button 430, a delete button 440, a close button 450, an icon (display indication) 460 are provided.

In the information display area 410, a folder 700 having a name of "0_test", a file 710 having a name of "document.pdf", a file 720 having a name of "poto1.pdf" are displayed. The print button 420 is the button for executing the print of, for example, the file 710 having the name of "document.pdf" displayed in the information display area 410. The view button 430 is the button for executing the viewing of, for example, the file 720 having the name of "poto1.pdf". The delete button 440 is the button for deleting the file 710, the file 720 or the like displayed in the information display area 410, from the USB memory 210. The close button 450 is the execution button for closing the related information window 400 which the user currently views.

The icon 460 indicates that the USB memory 210 is inserted into the external memory I/F unit 90 in the left direction and that the external memory inserted into the external memory I/F unit 90 is a USB memory, that is, the type of external memory inserted into the external memory I/F unit 90. Specifically, the icon 460 indicates a design for showing the USB memory 210 and the insert direction of the USB memory 210 by directing the connection terminal part of the above design to the insert direction.

When the user selects a file among the files displayed in the information display area 410 and pushes the intended execution button, the CPU 10 executes the function corresponding to the pushed execution button, for the selected file.

When the user withdraws the USB memory 210 from the external memory I/F unit 90, the CPU 10 detects that the USB memory 210 is withdrawn from the external memory I/F unit 90 and specifies the external memory I/F unit 90 in which the withdrawal operation is detected. Then, the CPU 10 obtains the ID assigned to the specified external I/F unit 90. In accordance with the obtained ID, the CPU 10 obtains the information relating to the direction of the connection terminal of the specified external memory I/F unit 90 from the device table stored in the nonvolatile memory 30 again, and determines the movement direction of the related information window 400 corresponding to the detected withdrawal operation.

The CPU 10 specifies the related information window 400 to be moved in accordance with the ID of the related information window 400, which is related to the ID of the external memory I/F unit 90 in which the withdrawal operation is detected. The CPU 10 instructs the operation display unit 80 to delete the specified related information window 400 while the specified related information window 400 is moved in the movement direction which is earlier determined (the direction in which the USB memory 210 is withdrawn, (that is, the right direction)). Specifically, the CPU 10 instructs the operation display unit 80 to delete the related information window 400 from the liquid crystal display unit 300 by carrying out the slide-out of the related information window 400 in the direction in which the USB memory 210 is withdrawn (right direction) (the display contents are changed in order of FIG. 2C, FIG. 2B and FIG. 2A).

<Execution of the Print Process>

Next, the case in which the print process for an optional file stored in the USB memory 210 is executed will be explained.

Figure 3A:
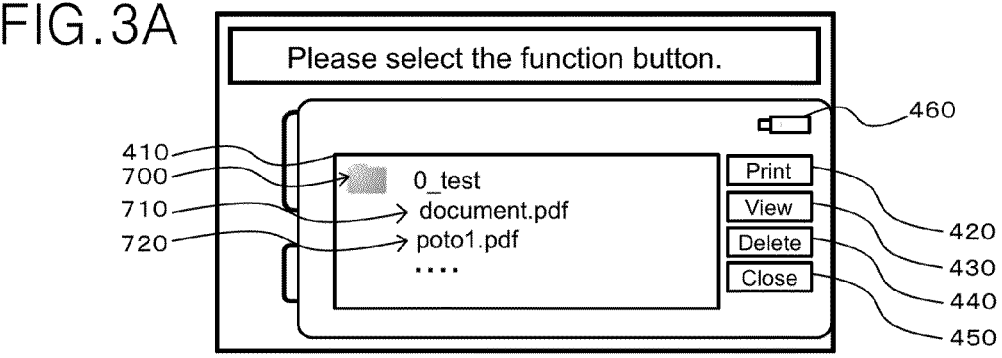
FIGS. 3A to 3C are examples of the display contents in case that the file "document.pdf" is printed out.
Figure 3B:
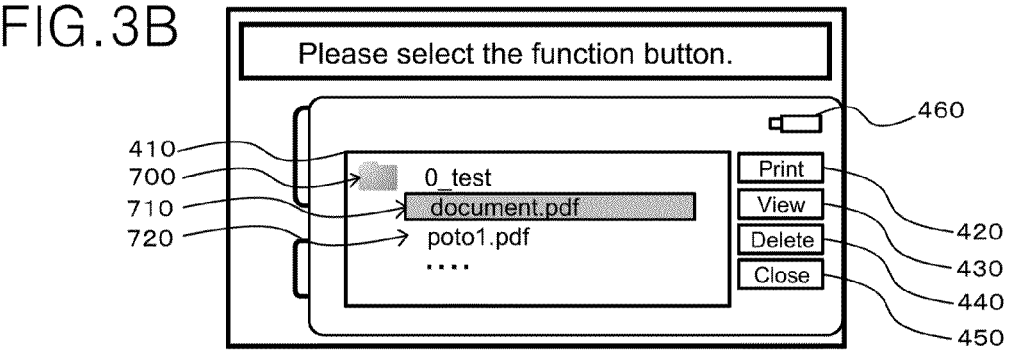
Figure 3C:
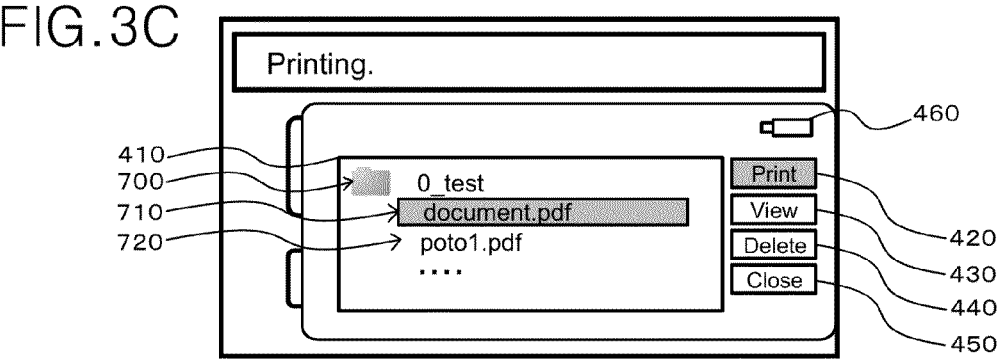

FIGS. 3A to 3C are examples of the display contents in case that the file 710 having the name of "document.pdf" is printed out. FIG. 3A shows the same state as FIG. 2C.

FIG. 3B shows the state in which the file 710 having the name of "document.pdf" is selected by the user in the information display area 410 shown in FIG. 3A. FIG. 3C shows the state in which the user pushes the print button 420. As described above, the user can instruct the image processing apparatus 100 to execute the print process for an optional file by selecting the optional file displayed in the information display area 410 and pushing the print button 420.

<Temporary Delete and Display Process for the Related Information Window>

Next, the operation in which the related information window 400 is closed on the liquid crystal display unit 300 will be explained.

Figure 4A:
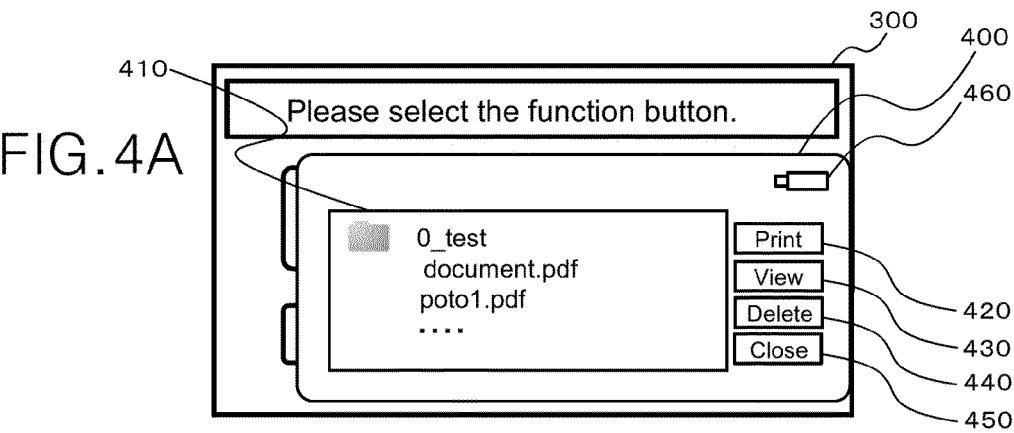
FIG. 4A to 4C are examples of the display contents in case that the related information window is temporarily deleted and displayed again.
Figure 4B:
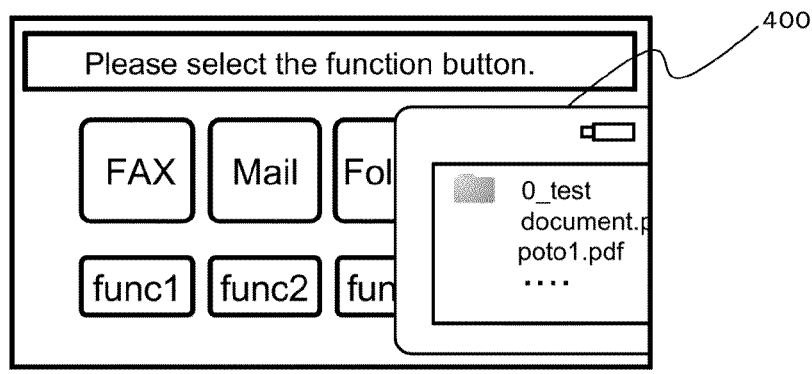
Figure 4C:
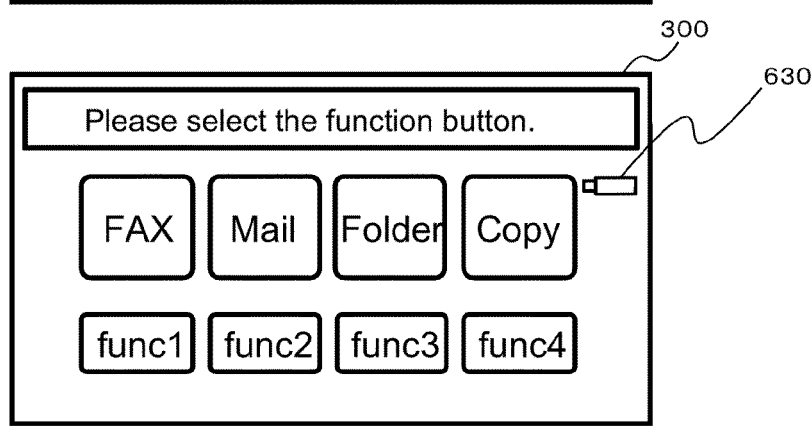

FIGS. 4A to 4C shows the examples of the display contents in case that the related information window 400 is temporarily deleted and displayed again. FIG. 4A shows the same state as FIG. 2C.

FIG. 4B is the example of the display contents showing the state in which the icon 460 is selected by the user in the state shown in FIG. 4A and the related information window 400 is deleted from the liquid crystal display unit 300 while the related information window 400 is moved in the direction opposite to the direction in which the USB memory 210 is inserted into the external memory I/F unit 90. In FIG. 4B, the state in which by selecting the icon 460 by the user, the movement of the related information window 400 in the right direction is started and the slide-out of the related information window 400 is carried out, is shown.

FIG. 4C is the example of the display contents showing the state in which the movement of the related information window 400 is finished and the related information window 400 is deleted from the liquid crystal display unit 300. In FIG. 4C, instead of the related information window 400 deleted from the liquid crystal display unit 300, the icon 630 (corresponding indication) is displayed on the liquid crystal display unit 300.

The icon 630 indicates a design for showing the USB memory 210 and the insert direction of the USB memory 210 by directing the connection terminal part of the above design to the insert direction. The icon 630 shown in FIG. 4C may be the same as the icon 460 shown in FIG. 4A. The icon 630 may be discriminated from the icon 460, for example, by changing the coloring according to the state.

When the user pushes the icon 630 and the CPU 10 detects that the icon 630 is pushed on the liquid crystal display unit 300, the CPU 10 instructs the operation display unit 80 to display the related information window 400 so as to appear in the liquid crystal display 300 again while the related information window 400 is moved in the direction in which the USB memory 210 is inserted (that is, the left direction). Specifically, the CPU 10 instructs the operation display unit 80 to display the related information window 400 by carrying out the slide-in of the related information window 400 on the liquid crystal display unit 300 in the direction in which the USB memory 210 is inserted (from right to left) (the display contents are changed in order of FIG. 4C, FIG. 4B and FIG. 4A).

<Movement Display in Case that the Memory Device is Inserted and Withdrawn in the Right-and-Left Direction>

Next, the case in which the insert direction of the memory device is from left to right and the withdrawal direction of the memory device is from right to left and the memory device is inserted into and withdrawn from the external memory I/F unit 90, will be explained. In this case, instead of the USB memory 210, an SD memory card (hereinafter, referred to as SD card) in which files having the DCF (Design rule for Camera File system) format are stored is inserted and withdrawn as the memory device. The connection terminal of the external memory I/F unit 90 for the SD card 220 is provided on the left side of the liquid crystal display unit 300. The SD card 220 is inserted into and withdrawn from the above external memory I/F unit 90.

Figure 5A:
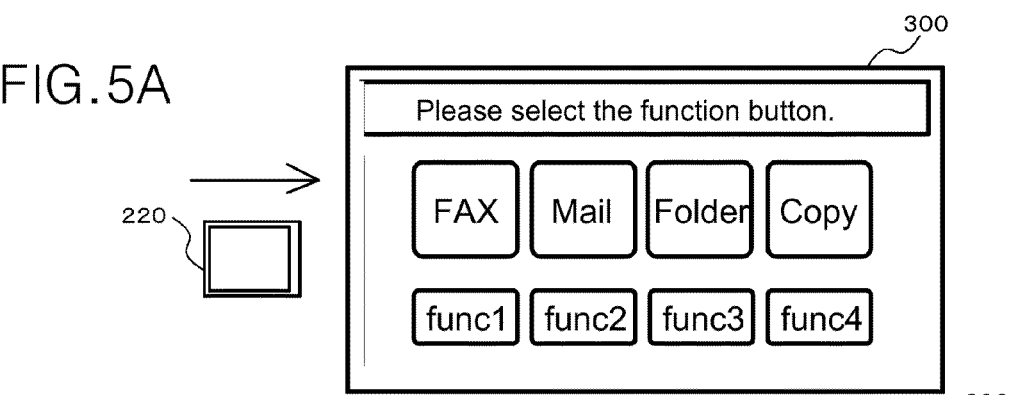
FIGS. 5A to 5C are examples of the display contents in case that the SD card is inserted into and withdrawn from the external memory I/F unit of the image processing apparatus in the right-and-left direction.
Figure 5B:
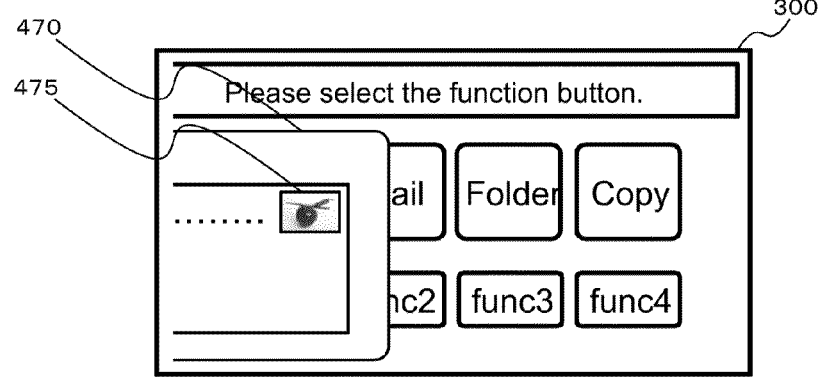
Figure 5C:
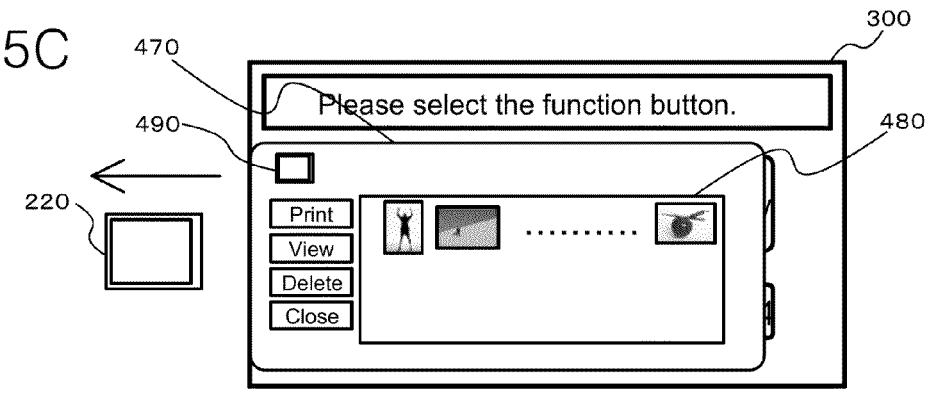

FIGS. 5A to 5C are examples of the display contents in case that the SD card 220 is inserted into and withdrawn from the external memory I/F unit 90 of the image processing apparatus 100 in the right-and-left direction. In FIGS. 5A to 5C, when the SD card 220 is inserted into the external memory I/F unit 90 provided on the left side of the liquid crystal display unit 300 in the right direction from the left, the CPU 10 instructs the operation display unit 80 to carry out the slide-in of the related information window 470 in the right direction from the left end of the liquid crystal display unit 300. Further, when the SD card 220 is withdrawn from the external memory I/F unit 90, the CPU 10 instructs the operation display unit 80 to move the related information window 470 in the left direction and to carry out the slide-out of the related information window 470 so as to delete it from the left side of the liquid crystal display unit 300.

The related information window 470 is displayed on the liquid crystal display unit 300 while the related information window 470 is moved as shown in FIG. 5A, FIG. 5B and FIG. 5C in order. In the related information window 470, the image files stored in the SD card 220 are displayed by using the thumbnail images 475. FIG. 5C shows the state in which the movement of the related information window 470 on the liquid crystal display unit 300 is finished and the related information window 470 is stopped. The differences between the related information window 470 shown in FIG. 5C and the related information window 400 shown in FIG. 2C are as follows. The movement directions of the movement display of the related information windows are different from each other. The files displayed in the information display area 480 are displayed by using the thumbnail images. The icon 490 is displayed by using the icon corresponding to the SD card 220. With respect to the other points, the related information window 470 is the same as the related information window 400 shown in FIGS. 2A to 2C.

The timing at which the thumbnail images 475 are displayed in the information display area 480 will be explained separately.

<Movement Display by Using Balloon Pop-Up>

Next, by using FIGS. 6A to 6C, the examples of the display contents in which the related information window 500 appears by using the balloon pop-up, will be explained. In this case, the USB memory 230 in which FW (Firmware) update data are stored is inserted into and withdrawn from the external memory I/F unit 90 provided on the lower side of the liquid crystal display unit 300.

FIGS. 6A to 6C are examples of the display contents in case that the USB memory 230 is inserted into and withdrawn from the external memory I/F unit 90 provided on the lower side of the liquid crystal display unit 300, in the up-and-down direction. In FIGS. 6A to 6C, when the USB memory 230 is inserted into the external memory I/F unit 90, the CPU 10 instructs the operation display unit 80 to display the related information window 500 while the related information window 500 is moved by using the balloon pop-up. Further, when the USB memory 230 is withdrawn from the external memory I/F unit 90, the CPU 10 instructs the operation display unit 80 to delete the related information window 500 while the related information window 500 is moved. In the balloon pop-up, the related information window 500 is gradually displayed so as to expand a balloon. When the related information window 500 is deleted, the balloon may be deflated like a contrasting situation of expanding the balloon. Alternatively, the related information window 500 may be closed so as to burst the balloon.

The related information window 500 is displayed on the liquid crystal display unit 300 while the related information window 500 is moved as shown in FIG. 6A, FIG. 6B and FIG. 6C in order. FIG. 6C shows the state in which the movement of the related information window 500 on the liquid crystal display unit 300 is finished and the related information window 500 is stopped. The differences between the related information window 500 shown in FIG. 6C and the related information window 400 shown in FIG. 2C are as follows. In the related information window 500, the movement display is carried out by using the balloon pop-up. In FIG. 6C, because the files displayed in the information display area 510 are the FW update files, the update button 520 for updating the files stored in the USB memory 230 is provided in the related information window 500. The icon 465 corresponds to the USB memory 230 and indicates the design for showing the USB memory 230 and the insert direction of the USB memory 230 by directing the connecting terminal part of the above design to the insert direction. With respect to the other points, the related information window 500 is the same as the related information window 400 shown in FIGS. 2A to 2C. The close button 530 is the button having the same function as the close button 450 shown in FIG. 2C.

<Movement Display by Pop-Up/Close>

Next, the case in which the related information window is displayed on the liquid crystal display unit 300 and is deleted from the liquid crystal display unit 300 while the related information window is moved by the pop-up and the close, will be explained.

Figure 7A:
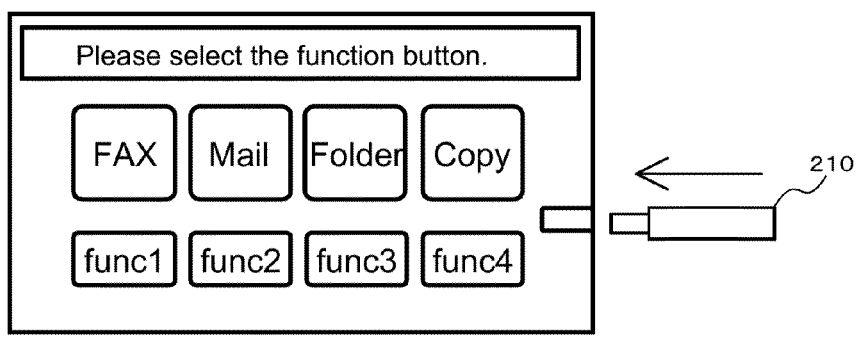
FIGS. 7A to 7C are examples of the display contents in case that the USB memory is inserted into and withdrawn from the external memory I/F unit provided on the right side of the liquid crystal display unit, in the right-and-left direction.
Figure 7B:
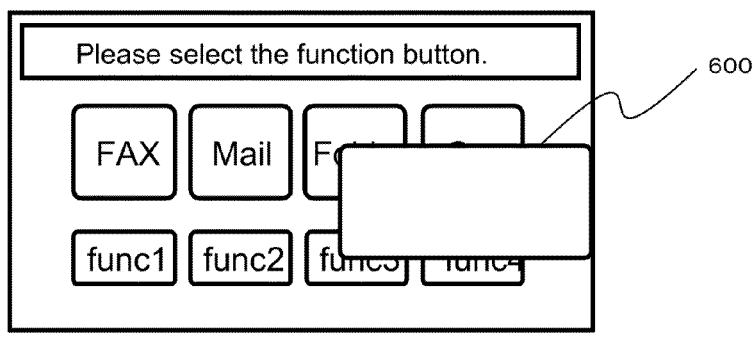
Figure 7C:
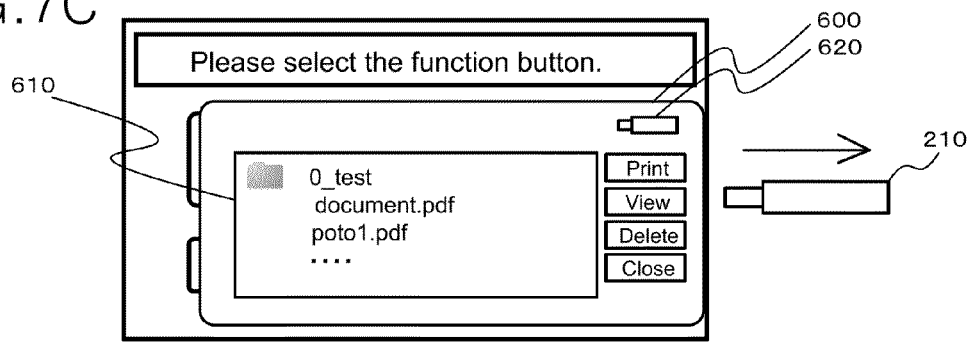

FIGS. 7A to 7C are examples of the display contents in case that USB memory 210 is inserted into and withdrawn from the external memory I/F unit 90 provided on the right side of the liquid crystal display unit 300, in the right-and-left direction. In FIGS. 7A to 7C, when the USB memory 210 is inserted into the external memory I/F unit 90 provided on the right side of the liquid crystal display unit 300, the CPU 10 instructs the operation display unit 80 to display the related information window 600 by the pop-up and then to move the related information window 600 in the left direction while the related information window 600 is extended. Further, when the USB memory 210 is withdrawn from the external memory I/F unit 90, the CPU 10 instructs the operation display unit 80 to move the related information window 600 in the right direction while the related information window 600 is reduced and to delete the related information window 600 from the liquid crystal display unit 300.

In the pop-up, the related information window 600 appears as another window which is different from the window which is displayed in the liquid crystal display unit 300. Further, in case that the related information window 600 is deleted, after the related information window 600 is moved while it is reduced, the related information window 600 may be deleted from the liquid crystal display unit 300. Alternatively, the related information window 600 may be deleted by closing it.

The related information window 600 is displayed on the liquid crystal display unit 300 while the related information window 600 is expanded and moved as shown in FIG. 7A, FIG. 7B and FIG. 7C in order. The difference between the related information window 600 shown in FIG. 7C and the related information window 400 shown in FIG. 2C is as follows. In FIG. 7C, after the related information window 600 is displayed by the pop-up, the related information window 600 is displayed while the related information window 600 is expanded in the left direction on the basis of the right side of the liquid crystal display unit 300. With respect to the other points, the related information window 600 is the same as the related information window 400 shown in FIGS. 2A to 2C. The information display area 610 is the area having the same function as the information display area 410 (FIG. 2C). The icon 620 is the icon having the same function as the icon 460 (FIG. 2C).

<Movement Display in Case that a Plurality of Memory Devices are Inserted and Withdrawn>

Next, the case in which after the related information window corresponding to one of the external memories is displayed, another related information window corresponding to another external memory is displayed on the liquid crystal display unit 300 so as to overlap the above related information window, will be explained.

Figure 8A:
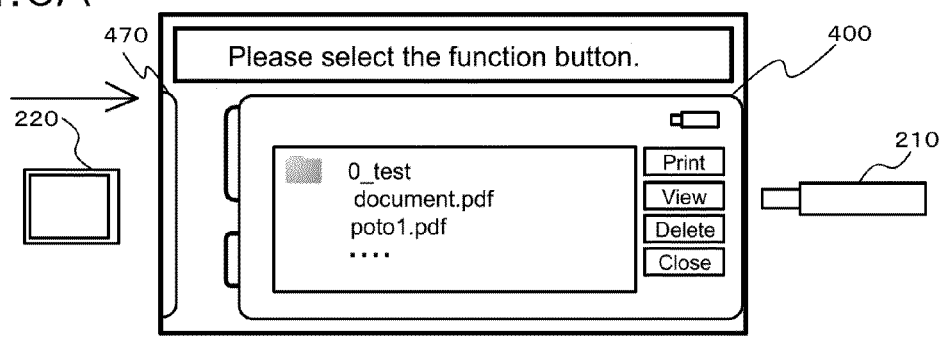
FIGS. 8A to 8C are examples of the display contents in case that each related information window corresponding to a plurality of memory devices is displayed on the operation display unit.
Figure 8B:
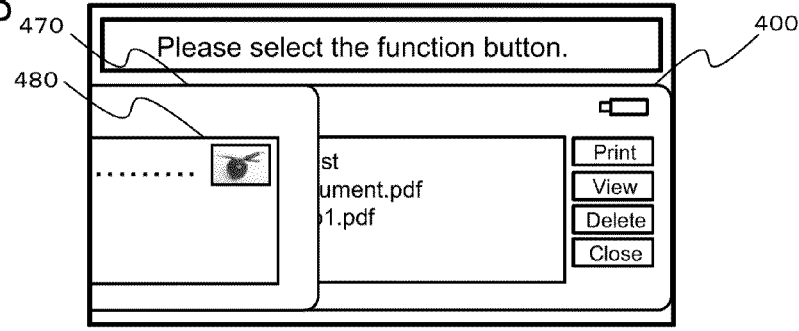
Figure 8C:
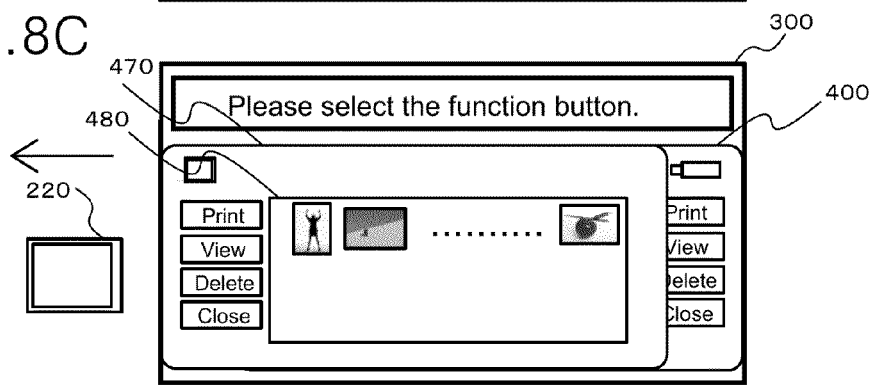

FIGS. 8A to 8C are examples of the display contents in case that each related information window corresponding to a plurality of memory devices is displayed on the liquid crystal display unit 300. As described above, the external memory I/F units 90 of the image processing apparatus 100 comprises a plurality of types of connection terminals of the memory devices. In the example shown in FIGS. 8A to 8C, the USB memory 210 is connected to the external memory I/F unit 90 provided on the right side of the liquid crystal display unit 300 and the SD card 220 is connected to the external memory I/F unit 90 provided on the left side of the liquid crystal display unit 300.

FIG. 8A is the example of the display contents showing the state in which the USB memory 210 is previously inserted in the left direction from the right of the liquid crystal display unit 300 and further the SD card 220 is inserted in the right direction from the left of the liquid crystal display unit 300. In FIG. 8A, the SD card 220 is inserted into the external memory I/F unit 90 in the right direction, and at the same time, the movement of the related information window 470 is started.

FIG. 8B is the example of the display contents in the course of the movement of the related information window 470 in the right direction from the state shown in FIG. 8A. In FIG. 8B, the related information window 470 corresponding to the SD card 220 is displayed so as to overlap the related information window 400 corresponding to the USB memory 210. The related information window 470 has the information display area 480. The slide-in of the related information window 470 is carried out with the information display area 480 in the right direction from the left side of the liquid crystal display unit 300.

In the example, the related information window 470 of the SD card 220 which is subsequently inserted is displayed so as to overlap the related information window 400 which has been displayed. Because it is considered that the user wants to view the names and the types of the files and the data stored in the memory device which is subsequently inserted, the CPU 10 instructs the operation display unit 80 to display the related information window 470 of the SD card 220 which is subsequently inserted by the user on the top in the liquid crystal display unit 300.

FIG. 8C is the example of the display contents showing the state in which the movement of the related information window 470 is finished and the related information window 470 is stopped. In FIG. 8C, the related information window 470 corresponding to the SD card 220 is displayed so as to overlap the related information window 400. Further, the files stored in the SD card 220 are displayed by using the thumbnail images. The related information window 470 is displayed so that the left end portion of the related information window 470 contacts to the left side of the liquid crystal display unit 300 and the related information window 470 is biased to the left side of the liquid crystal display unit 300. Further, the related information window 400 is displayed so that the right end portion of the related information window 400 contacts to the right side of the liquid crystal display unit 300 and the related information window 400 is biased to the right side of the liquid crystal display unit 300.

That is, in the example, each related information window is arranged by biasing the related information window so that the side of the related information window, which is opposite to the forward side of the related information window in the movement direction, contacts to the inner side of the liquid crystal display unit 300. Further, each related information window is arranged so as not to contact with the side of the liquid crystal display unit 300, which is faced to the forward side of the related information window in the movement direction. Therefore, even though a plurality of memory devices are inserted into the external memory I/F units 90, the top related information window does not occupy the whole area for displaying the related information windows. Because the user can view a part of the related information window of the inserted device, the user can recognize a plurality of memory devices connected to the external memory I/F unit 90.

As described above, in the example, the image processing apparatus 100 comprises a plurality of external memory I/F units 90 and a plurality of memory devices can be connected to the image processing apparatus 100. Further, each related information window corresponding to the memory device which is inserted into and withdrawn from the external memory I/F unit 90 can be displayed on the liquid crystal display unit 300 with respect to each memory device which is inserted and withdrawn. Therefore, the user can easily recognize the memory device which is inserted and withdrawn, by the movement display of the related information window 400.

In case that the SD card 220 is withdrawn from the external memory I/F unit 90, the CPU 10 instructs the operation display unit 80 to delete the related information window 470 so as to carry out the slide-out of the related information window 470 from the left side of the liquid crystal display unit 300 while the related information window 470 is moved in the left direction as shown in FIG. 8C, FIG. 8B and FIG. 8A in order. The CPU 10 instructs the operation display unit 80 to display the state shown in FIG. 2C, in which only the USB memory is inserted into the external memory I/F unit 90.

<Process at the Insertion Operation of the Device>

Next, the operation which is carried out since the USB memory 210 is inserted into the external memory I/F unit 90 until the related information window 400 is displayed, will be explained by using the flowchart.

In view of the examples shown in FIGS. 2A to 2C, in case that the USB memory 210 is inserted into and withdrawn from the external memory I/F unit 90 in which the insert direction of the USB memory 210 is the left direction from the right and the withdrawal direction is the right direction from the left, the operation of the image processing apparatus 100 will be explained. In this case, for example, the user carries out the insertion/withdrawal operation of the USB memory 210 for the external memory I/F unit 90 provided on the right side of the liquid crystal display unit 300.

Figure 9:
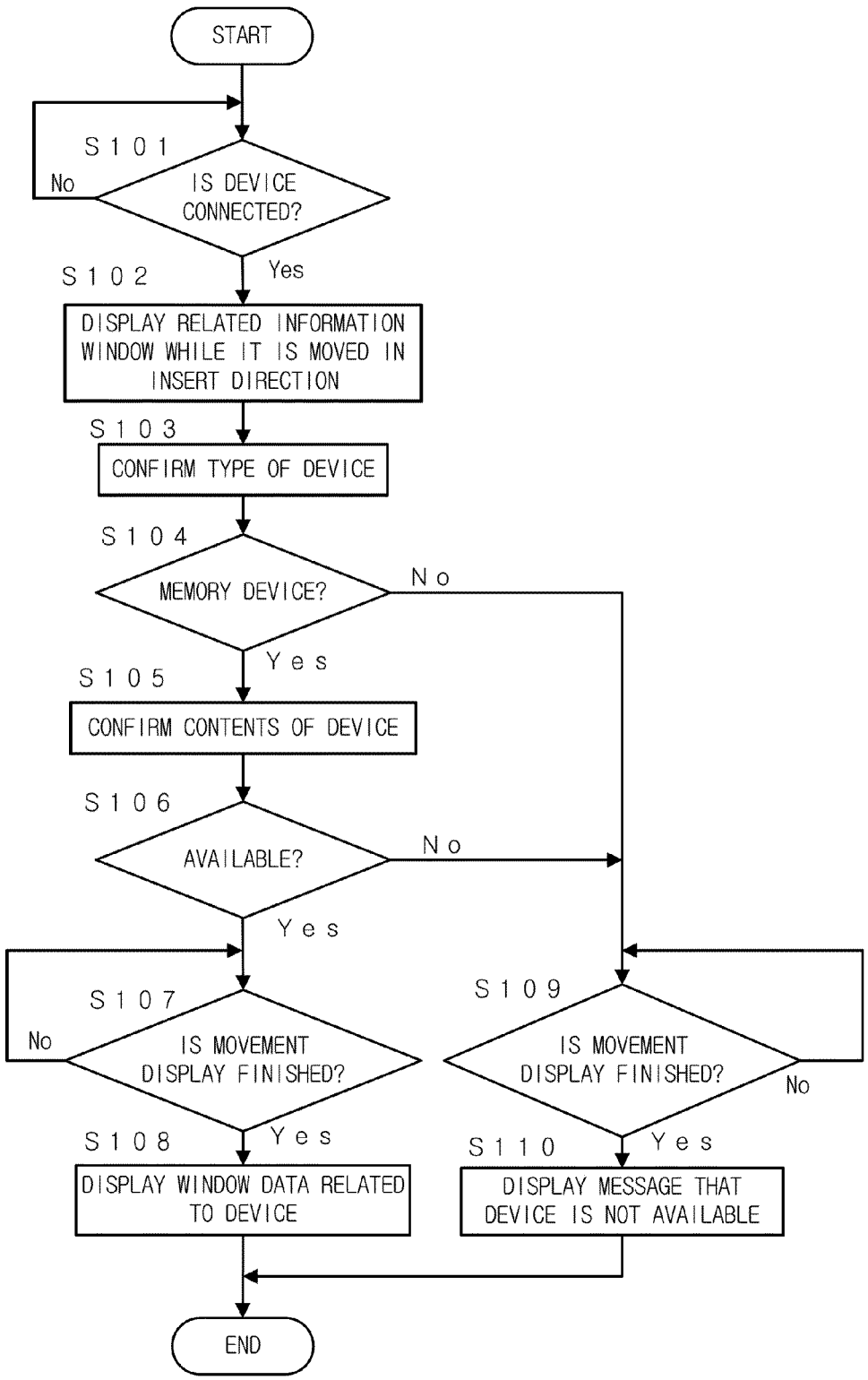
FIG. 9 is a flowchart showing the process since the USB memory is inserted into the external memory I/F unit until the related information window is displayed.

FIG. 9 shows the flowchart showing the process since the USB memory 210 is inserted into the external memory I/F unit 90 until the related information window 400 is displayed. The CPU 10 monitors that the device (electronic device) is connected to the external memory I/F unit 90. In case that the CPU 10 detects that the device is connected to the external memory I/F unit 90 (Step S101; Yes), the CPU 10 specifies the external memory I/F unit 90 to which the connection of the USB memory 210 is detected and obtains the ID assigned to this external memory I/F unit 90. The CPU 10 obtains the information relating to the direction of the connection terminal of this external memory I/F unit 90 from the device table stored in the nonvolatile memory 30 in accordance with the obtained ID. When the CPU 10 detects the connection of the device to the external memory I/F unit 90, the CPU 10 generates the related information window corresponding to the device and assigns the ID to the generated related information window. The CPU 10 relates the ID of the external memory I/F unit 90 to which the connection of the USB memory 210 is detected to the ID of the generated related information window 400 and stores them in the nonvolatile memory 30.

Then, the CPU 10 instructs the operation display unit 80 (liquid crystal display unit 300) to display the related information window 400 corresponding to the ID of the related information window, which is related to the ID of this external memory I/F unit 90, while the related information window 400 is moved in the direction in which the device is inserted into this external memory I/F unit 90 in accordance with the information relating to the direction of the connection terminal of the external memory I/F unit 90, which is obtained from the nonvolatile memory 30 (Step S102). The CPU 10 confirms the type of the device connected to the external memory I/F unit 90 (Step S103). In case that the device connected to the external memory I/F unit 90 is not a memory device (Step S104; No), the CPU 10 waits for the finish of the movement display of the related information window 400 (Step S109; Yes). Then, the CPU 10 instructs the operation display unit 80 to display the massage that this device is not available by the image processing apparatus 100, in the information display area 410 (Step S110). In this case, the device which is not a memory device includes, for example, a mouse, a modem and the like.

In case that the device connected to the external memory I/F unit 90 is a memory device (Step S104; Yes), the CPU 10 confirms the contents (data) stored in the memory device and judges whether the contents are available (Step S106). Incase that the contents which are stored in the memory device are available (Step S106; Yes), the CPU 10 waits for the finish of the movement display of the related information window 400 (Step S107; Yes). Then, the CPU 10 instructs the operation display unit 80 to display the window data related to the memory device (the window data corresponding to the contents stored in the memory device (information display area 410)) in the related information window 400 (Step S108). Specifically, the CPU 10 instructs the operation display unit 80 to display the type of the data, the name of the file, which are stored in the USB memory 210, in the information display area 410 of the related information window 400.

In case that the data stored in the memory device is not available, for example, the data stored in the memory device cannot be read or the data format is unknown (Step S106; No), the CPU 10 waits for the finish of the movement display of the related information window 400 (Step S109; Yes). Then, the CPU 10 instructs the operation display unit 80 to display the message that this device is not available by the image processing apparatus 100, in the information display area 410 (Step S110).

<Execution of the Process for Files>

Figure 10:
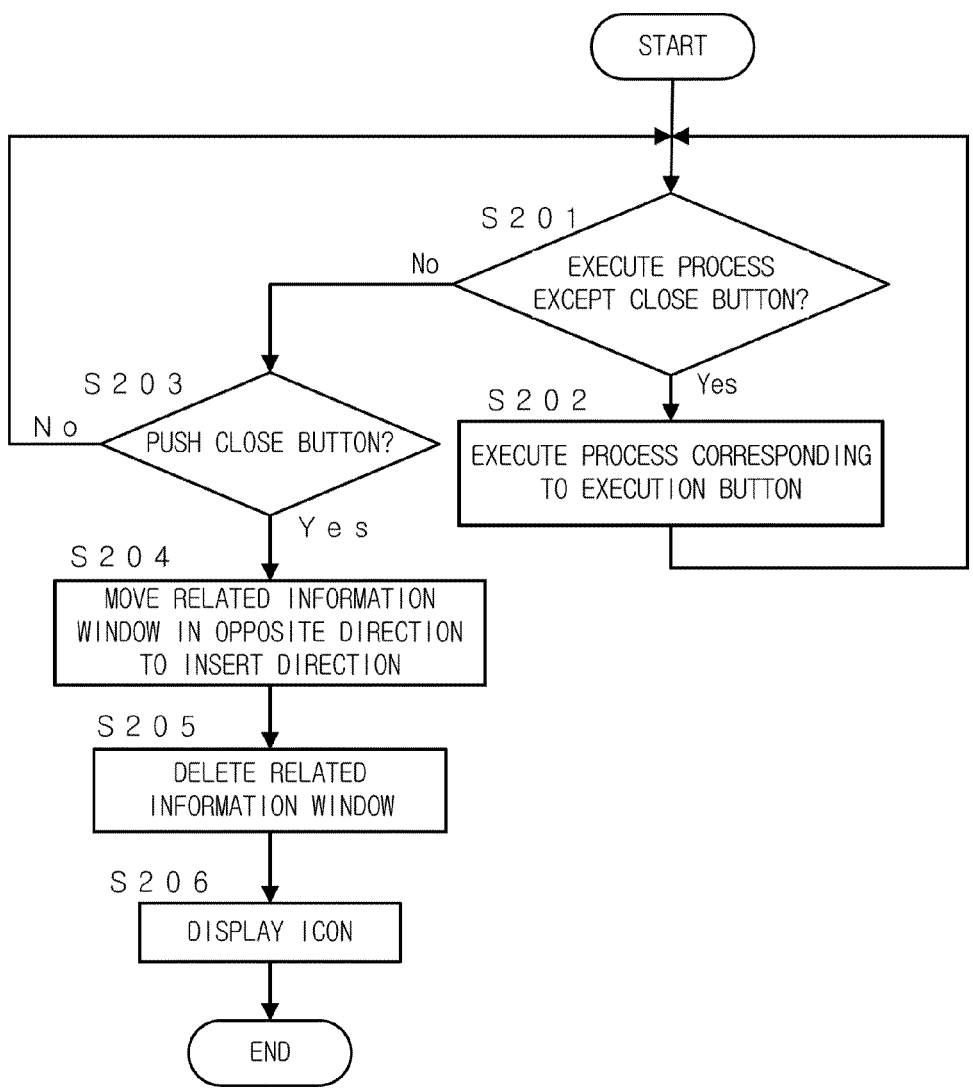
FIG. 10 is a flowchart showing the process for executing the process for the files stored in the USB memory.

FIG. 10 shows the flowchart of the process for executing the process for the files stored in the USB memory 210. The flowchart of the process will be explained in view of the examples shown in FIGS. 3A to 3C. Further, it is assumed that the current state of the liquid crystal display unit 300 is one shown in FIG. 3A.

The CPU 10 waits for the reception of the selection operation from the user via the related information window 400. For example, when the file 710 having the name of "document.pdf" is selected and the execution button, such as the print button 420, the view button 430 or the like is pushed (Step S201; Yes), the CPU 10 executes the process corresponding to the pushed execution button (Step S202).

<Process 1 for Temporality Deleting the Related Information Window 400>

In case that the close button 450 is pushed (Step S201; No, Step S203; Yes), the CPU 10 instructs the operation display unit 80 to move the related information window 400 in the direction opposite to the direction in which the USB memory 210 is inserted into the external memory I/F unit 90 (Step S204), and further to delete the related information window 400 from the liquid crystal display unit 300 (Step S205). The CPU 10 instructs the operation display unit 80 to display the icon 630 (FIG. 4C) showing the USB memory 210 connected to the external memory I/F unit 90 so as to indicate the direction in which the USB memory 210 is connected to the external memory I/F unit 90 and the type of the connected memory device (Step S206).

<Process at the Withdrawal Operation of the Memory Device>

Next, the process which is executed when the USB memory 210 inserted into the external memory I/F unit 90 is withdrawn, will be explained.

Figure 11:
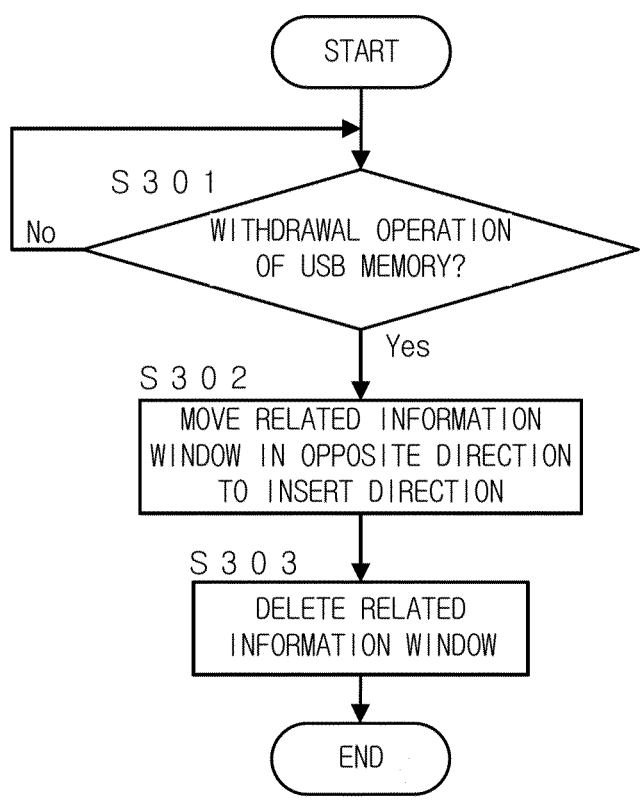
FIG. 11 is a flowchart showing the process which is executed when the USB memory is withdrawn from the external memory I/F unit.

FIG. 11 shows the flowchart of the process which is executed when the USB memory 210 is withdrawn from the external memory I/F unit 90.

When the CPU 10 detects that the USB memory 210 is withdrawn from the external memory I/F unit 90 by the user (Step S301; Yes), the CPU 10 specifies the external memory I/F unit 90 in which the withdrawal operation is detected, and obtains the ID of this external memory I/F unit 90. Further, in accordance with the obtained ID, the CPU 10 again obtains the information relating to the direction of the connection terminal of the specified external memory I/F unit 90 from the device table stored in the nonvolatile memory 30, and determines the movement direction of the related information window 400 corresponding to the detected withdrawal operation. The CPU 10 specifies the related information window 400 to be moved in accordance with the ID of the related information window 400, which is related to the ID of the external memory I/F unit 90 in which the withdrawal operation is detected.

The CPU 10 instructs the operation display unit 80 to move the specified related information window 400 in the movement direction which is earlier determined (the direction opposite to the direction in which the USB memory 210 is inserted into the external memory I/F unit 90 (that is, the withdrawal direction)) (Step S302) and to delete the specified related information window 400 from the liquid crystal display unit 300 (Step S303).

Therefore, because the user withdraws the USB memory 210 from the external memory I/F unit 90 and can confirm the slide-out of the related information window 400 corresponding to the withdrawal operation via the liquid crystal display unit 300, the user can intuitively recognize the relation between the withdrawn USB memory 210 and the related information window 400 which is slid out from the liquid crystal display unit 300.

<Process 2 for Temporality Deleting the Related Information Window 400>

Figure 12:
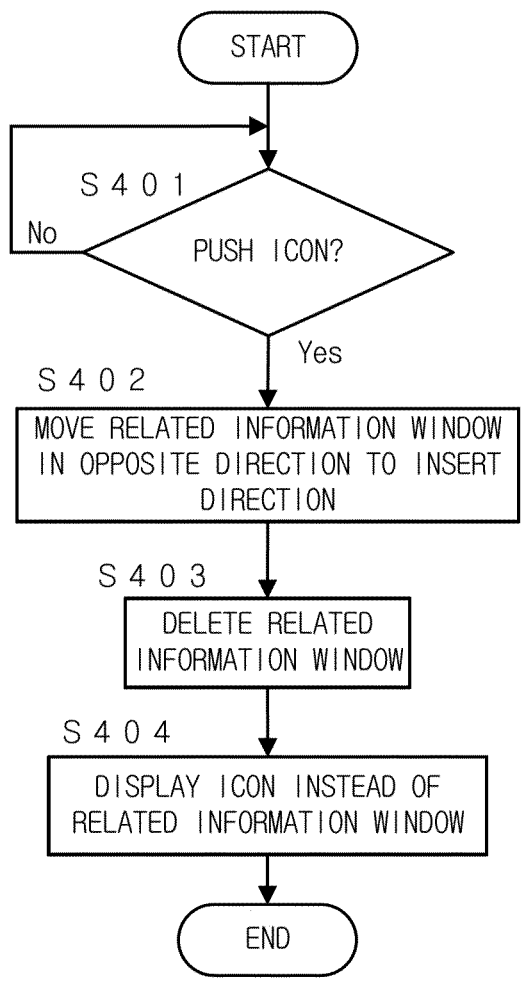
FIG. 12 is a flowchart showing the process which is executed when the icon (FIG. 4A) displayed in the related information window is selected by the user in the state shown in FIG. 4A.

FIG. 12 shows the flowchart of the process which is executed when the icon 460 (FIG. 4A) displayed in the related information window 400 is selected by the user in the state shown in FIG. 4A. The CPU 10 monitors that the icon 460 is pushed by the user. In case that the user pushes the icon 460 (Step S401; Yes), the user instructs the operation display unit 80 to move the related information window 400 of the USB memory 210 corresponding to the icon 460 in the direction opposite to the direction in which the USB memory 210 is inserted into the external memory I/F unit 90 (Step S402), and further to delete the related information window 400 from the liquid crystal display unit 300 (Step S403).

The CPU 10 instructs the operation display unit 80 to display the icon 630 (FIG. 4C) showing that the USB memory 210 is connected to the external memory I/F unit 90 in the liquid crystal display unit 300 so as to indicate the direction in which the USB memory 210 is inserted and the type of the memory device (Step S404).

Second Embodiment

In the above first embodiment, the related information window 400 is displayed on the liquid crystal display unit 300 so as to move the related information window 400 in the same direction as the direction of the insertion/withdrawal operation when the device is inserted into and withdrawn from the external memory I/F unit 90. In the second embodiment, instead of the direction of the insertion/withdrawal operation of the device, the related information window 400 is displayed while the related information window 400 is moved in the direction from the position of the external memory I/F unit 90 to which the device is connected, to the liquid crystal display unit 300.

Figure 13A:
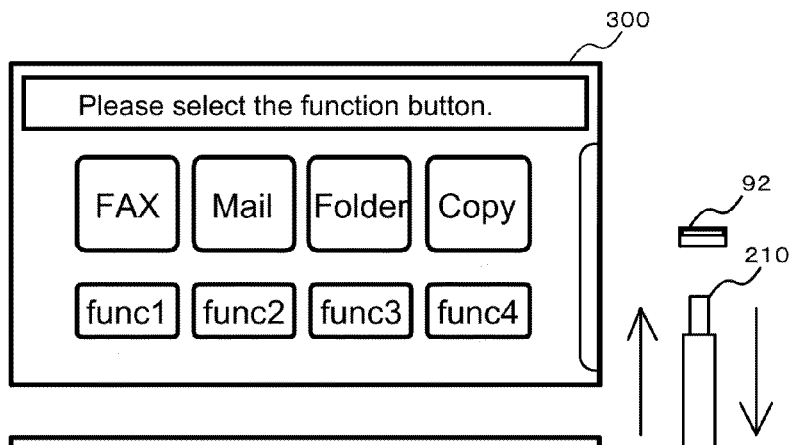
FIGS. 13A to 13C are examples of the display contents in case that the USB memory is inserted into the external memory I/F unit provided on the right side of the liquid crystal display unit.
Figure 13B:
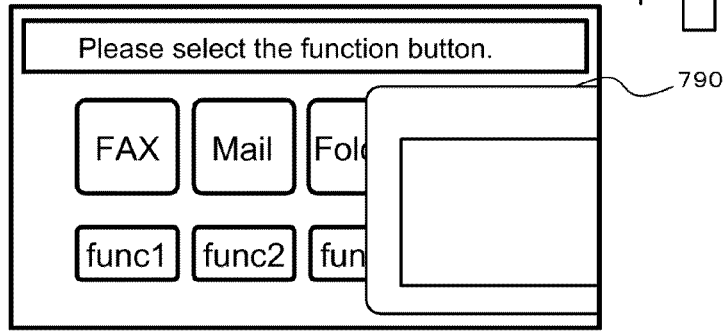
Figure 13C:
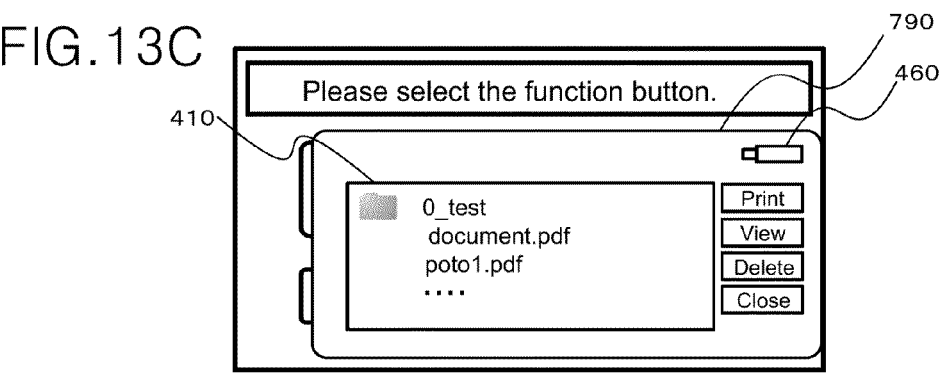

FIGS. 13A to 13C are examples of the display contents in case that the USB memory 210 is inserted into the external memory I/F unit 92 provided on the right side of the liquid crystal display 300. In FIGS. 13A to 13C, because the external memory I/F unit 92 is provided on the right side of the liquid crystal display unit 300, the related information window 790 is displayed so as to move it in the left direction from the right side of the liquid crystal display unit 300.

In case that the external memory I/F unit 92 is provided on the left side of the liquid crystal display unit 300, the CPU 10 instructs the operation display unit 80 to display the related information window 790 so as to move it in the right direction from the left side of the liquid crystal display unit 300. In case that the external memory I/F unit 92 is provided on the upper side of the liquid crystal display unit 300, the CPU 10 instructs the operation display unit 80 to display the related information window 790 so as to move it in the lower direction from the upper side of the liquid crystal display unit 300. Further, in case that the external memory I/F unit 92 is provided on the lower side of the liquid crystal display unit 300, the CPU 10 instructs the operation display unit 80 to display the related information window 790 so as to move it in the upper direction from the lower side of the liquid crystal display unit 300.

As described above, in the second embodiment, the movement direction of the related information window 790 is determined according to the position in which the external memory I/F unit 92 is provided. Therefore, even though the device is inserted into and withdrawn from the external memory I/F unit 92 in any direction, the movement display of the related information window 790 is carried out regardless of the direction of the insertion/withdrawal operation of the device. For example, even though the connection terminal of the external memory I/F unit 92 provided on the right side of the liquid crystal display unit 300 is provided so as to be connected to the device in the upper direction or in the lower direction, the related information window 790 appears while the related information window 790 is moved in the direction from the position of the external memory I/F unit 92 to the liquid crystal display unit 300, that is, in the left direction from the right side of the liquid crystal display unit 300.

In FIGS. 13A to 13C, the external memory I/F unit 92 is provided on the right side of the liquid crystal display unit 300 and the direction of the insertion/withdrawal operation of the USB memory 210 is the upper direction as the drawings are viewed from above. When the CPU 10 detects the insertion operation in which the USB memory 210 is inserted into the external memory I/F unit 92, the CPU 10 instructs the operation display unit 80 to display the related information window 790 while the related information window 790 is moved in the direction from the external memory I/F unit 92 to the liquid crystal display unit 300. Further, when the CPU 10 detects the withdrawal operation in which the USB memory 210 is withdrawn from the external memory I/F unit 92, the CPU 10 instructs the operation display unit 80 to delete the related information window 790 from the liquid crystal display unit 300 while the related information window 790 is moved in the direction opposite to the direction from the external memory I/F unit 92 to the liquid crystal display unit 300.

The display contents displayed in the related information window 790 according to the second embodiment is the same as the display contents displayed in the related information window 400, which are explained in FIGS. 2A to 2C. Therefore, the explanation thereof is omitted.

The difference between the flowchart of the process in the second embodiment and the flowchart of the process in the first embodiment, is that the related information window 400 is displayed while the related information window 400 is moved in Step S102 shown in FIG. 9. That is, in the first embodiment, the related information window 400 is moved in the insert direction of the USB memory 210 inserted into the external memory I/F unit 90. On the other hand, in the second embodiment, the related information window 790 is moved in the direction from the position of the external memory I/F unit 92 to the liquid crystal display unit 300. With respect to the other points, the flowchart of the second embodiment is the same as that of the first embodiment. Therefore, for example, by replacing "DISPLAY RELATED INFORMATION WINDOW WHILE IT IS MOVED IN INSERT DIRECTION" of Step S102 in the flowchart shown in FIG. 9 according to the first embodiment, with "DISPLAY RELATED INFORMATION WINDOW WHILE IT IS MOVED IN DIRECTION FROM POSITION OF EXTERNAL MEMORY I/F UNIT TO LIQUID CRYSTAL DISPLAY UNIT", the flowchart shown in FIG. 9 can be treated as the flowchart according to the second embodiment.

<Movement Display in Case that the External Memory I/F Unit is Positioned on the Lower Right Side of the Liquid Crystal Display Unit>

Next, the case in which the external memory I/F unit 93 is provided on the lower right side of the liquid crystal display unit 300, will be explained.

Figure 14C:
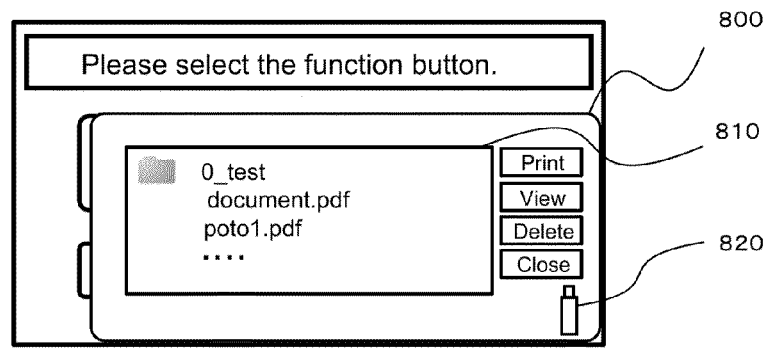
FIGS. 14A to 14C are examples of the display contents in case that the USB memory is inserted into the external memory I/F unit provided on the lower right side of the liquid crystal display unit.
Figure 14B:
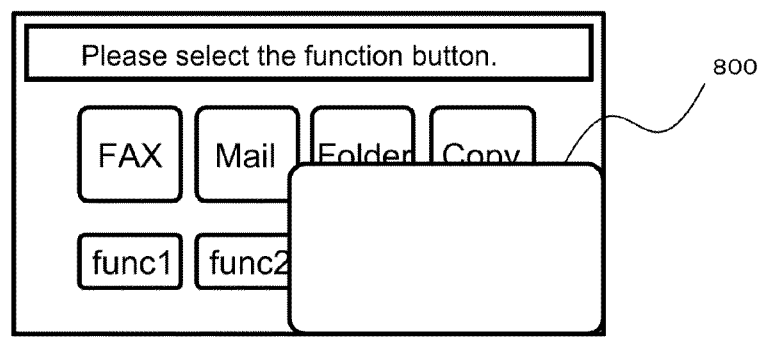
Figure 14A:
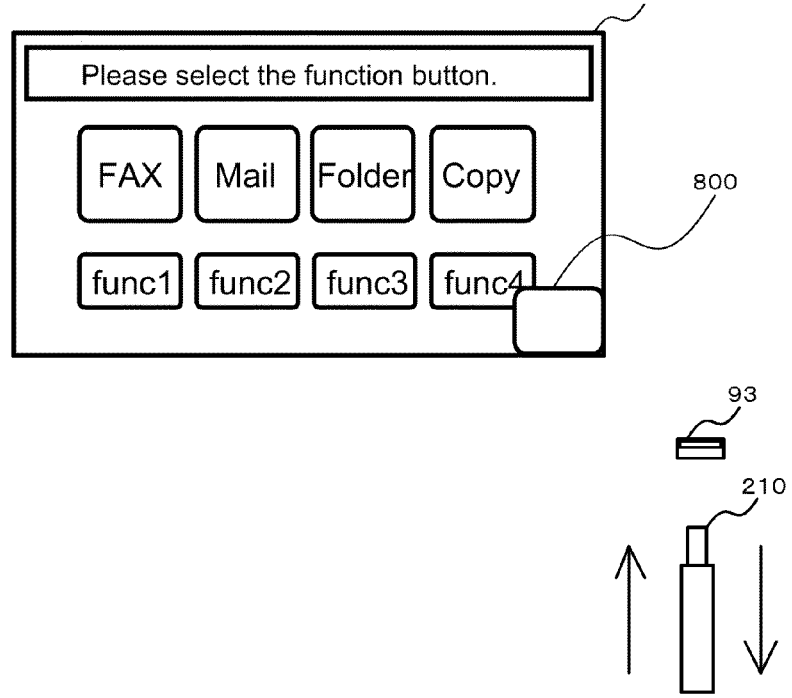

FIGS. 14A to 14C are examples of the display contents in case that the USB memory 210 is inserted into the external memory I/F unit 93 provided on the lower right side of the liquid crystal display unit 300. In FIGS. 14A to 14C, the related information window 800 is enlarged while the related information window 800 is moved by the zoom-in at the insertion of the USB memory 210. The related information window 800 is reduced while the related information window 800 is moved by the zoom-out at the withdrawal of the USB memory 210.

Herein, the term "zoom-in" means that the related information window 800 is displayed so as to gradually enlarge it. Further, herein, the term "zoom-out" means that the related information window 800 is displayed so as to gradually reduce it. In this embodiment, the zoom-in is carried out while the center of the related information window 800 is moved. When the related information window 800 is deleted, the zoom-out is carried out while the center of the related information window 800 is moved.

The zoom-in of the related information window 800 is carried out to display it on the liquid crystal window 300 while the center of the related information window 800 is moved as shown in FIG. 14A, FIG. 14B and FIG. 14C in order. In FIG. 14C, the movement of the related information window 800 on the liquid crystal display unit 300 is finished and the related information window 800 is stopped. The differences between the related information window 800 shown in FIG. 14C and the related information window 400 shown in FIG. 2C are as follows. The related information window 800 is moved and displayed by the zoom-in/zoom-out. The right side and the lower side of the related information window 800 contact to the inner side of the corner of the lower right side of the liquid crystal display unit 300 and the related information window 800 is stopped so as to bias it to the above corner of the lower side of the liquid crystal display unit 300. The position in which the icon 820 is arranged is different from the position in which the icon 460 is arranged. With respect to the other points, the related information window 800 shown in FIG. 14C is the same as the related information window 400 shown in FIG. 2C. The icon 820 indicates a design for showing the USB memory 210 and is arranged on the lower right side of the liquid crystal display unit 300 so as to indicate the position of the external memory I/F unit 93 into which the USB memory 210 is inserted. The information display area 810 has the same function as the information display area 410 shown in FIG. 2C.

As described above, in the above first embodiment, when the CPU 10 detects the insertion/withdrawal operation of the memory device, the CPU 10 instructs the operation display unit 80 to display the related information window 400 corresponding to this memory device so as to move the related information window 400 in the direction which is the same as the direction of the insertion/withdrawal operation of the memory device by the user. Therefore, by the displayed related information window 400, the user can intuitively and easily recognize the direction in which the insertion/withdrawal operation of the memory device is carried out.

Further, in the second embodiment, when the CPU 10 detects the insertion/withdrawal operation of the memory device, the CPU 10 instructs the operation display unit 80 to display the related information window 790 or 800 corresponding to this memory device so as to move the related information window 790 or 800 in the direction from the position of the external memory I/F unit 92 or 93 in which the insertion/withdrawal operation is detected, to the liquid crystal display unit 300 or in the opposite direction. Therefore, by the displayed related information window 790 or 800, the user can intuitively and easily recognize the position of the external memory I/F unit 92 or 93 in which the insertion/withdrawal operation is carried out.

As described above, the embodiments are explained by using the drawings. However, in the present invention, the concrete configuration is not limited to the above embodiments. In the present invention, various modifications of the above embodiments or the addition of various functions or the like to the embodiments can be carried out without departing from the gist of the invention.

<Movement Display Starting Process after Judging the Device>

In the first embodiment, when the CPU 10 detects that the USE memory 210 (electronic device) is connected to the external memory I/F unit 90, the CPU 10 instructs the operation display unit 80 to display the related information window 400 on the liquid crystal display unit 300 while the related information window 400 is moved before the type of the device is confirmed. In this example, when the device (electronic device) is connected to the external memory I/F unit 90, the CPU 10 judges the type of the device connected to the external memory I/F unit 90. In case that the connected device is a memory device, the CPU 10 instructs the operation display unit 80 to display the related information window 400 while the related information window 400 is moved.

In this case, the configuration of the hardware in the image processing apparatus 100 is the same as that of the first embodiment. This example is different from the first embodiment in only the timing at which the related information window 400 is displayed.

Figure 15A:
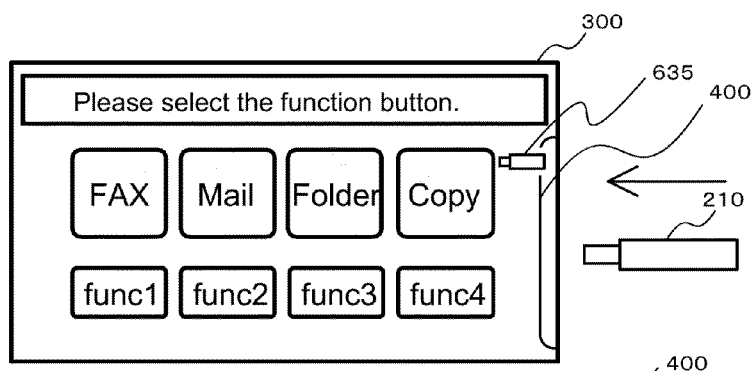
FIGS. 15A to 15C are examples of the display contents displayed while the related information window is moved after the CPU judges that the connected device is a memory device.
Figure 15B:
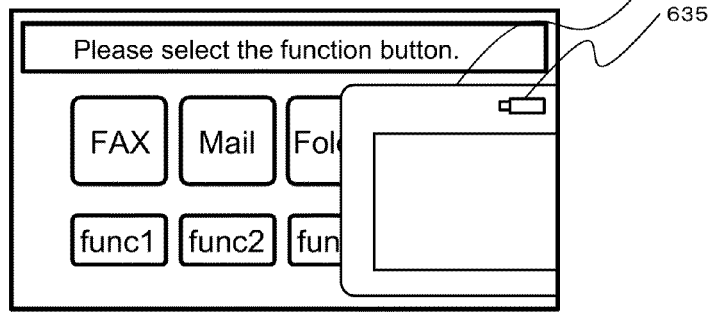
Figure 15C:
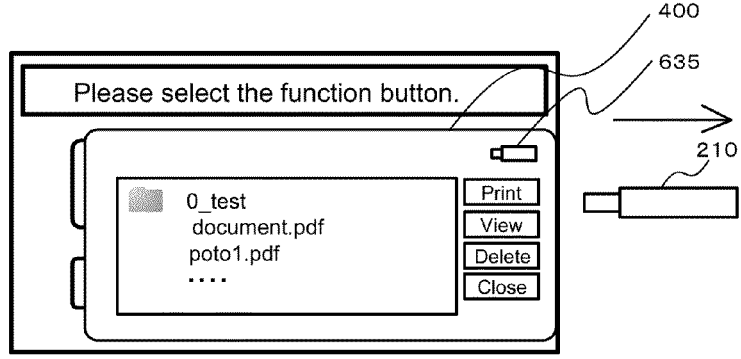

FIGS. 15A to 15C are examples of the display contents displayed while the related information window 400 is moved after the CPU 10 judges that the connected device is a memory device. As compared with the first embodiment, the CPU 10 judges whether the device connected to the external memory I/F unit 90 is a memory device, before the movement of the related information window 400 is started. Therefore, in this example, until the type of the connected device is judged, the movement of the related information window 400 is not started.

In FIG. 15A, when the movement of the related information window 400 is started, the device inserted into the external memory I/F unit 90 is recognized as the memory device. Therefore, when the movement of the related information window 400 is started, the icon (corresponding indication) 635 indicating the device inserted into the external memory I/F unit 90 has been displayed by the CPU 10.

Next, the process for displaying the related information window 400 according to this example will be explained in accordance with FIG. 16. The steps which are the same as those in FIG. 9 are denoted by the same step numbers as FIG. 9.

In case that the device is connected to the external memory I/F unit 90 (Step S101; Yes), the CPU 10 confirms the type of the connected device (Step S501). In case that the connected device is a memory device (Step S502; Yes), the CPU 10 instructs the operation display unit 80 to display the related information window 400 corresponding to the memory device while the related information window 400 is moved in the direction which is the same as the direction in which the memory device is inserted into the external memory I/F unit 90 (Step S503). In case that the connected device is not a memory device (Step S502; No), the CPU 10 ends the process without displaying the windows.

The following process is the same as the process following Step S105 in FIG. 9. The explanation of the following process is omitted.

<Movement Display Starting Process after Specifying the Data Format>

The timing at which the related information window 400 is displayed is limited to the timings described above. After the data format of the connected device is specified, the related information window 400 may be displayed so as to display the data in the related information window 400 while the related information window 400 is moved. For example, the method for displaying the related information window 470 having the thumbnail images 475 explained in FIGS. 5A to 5C is included in this example.

Figure 17:
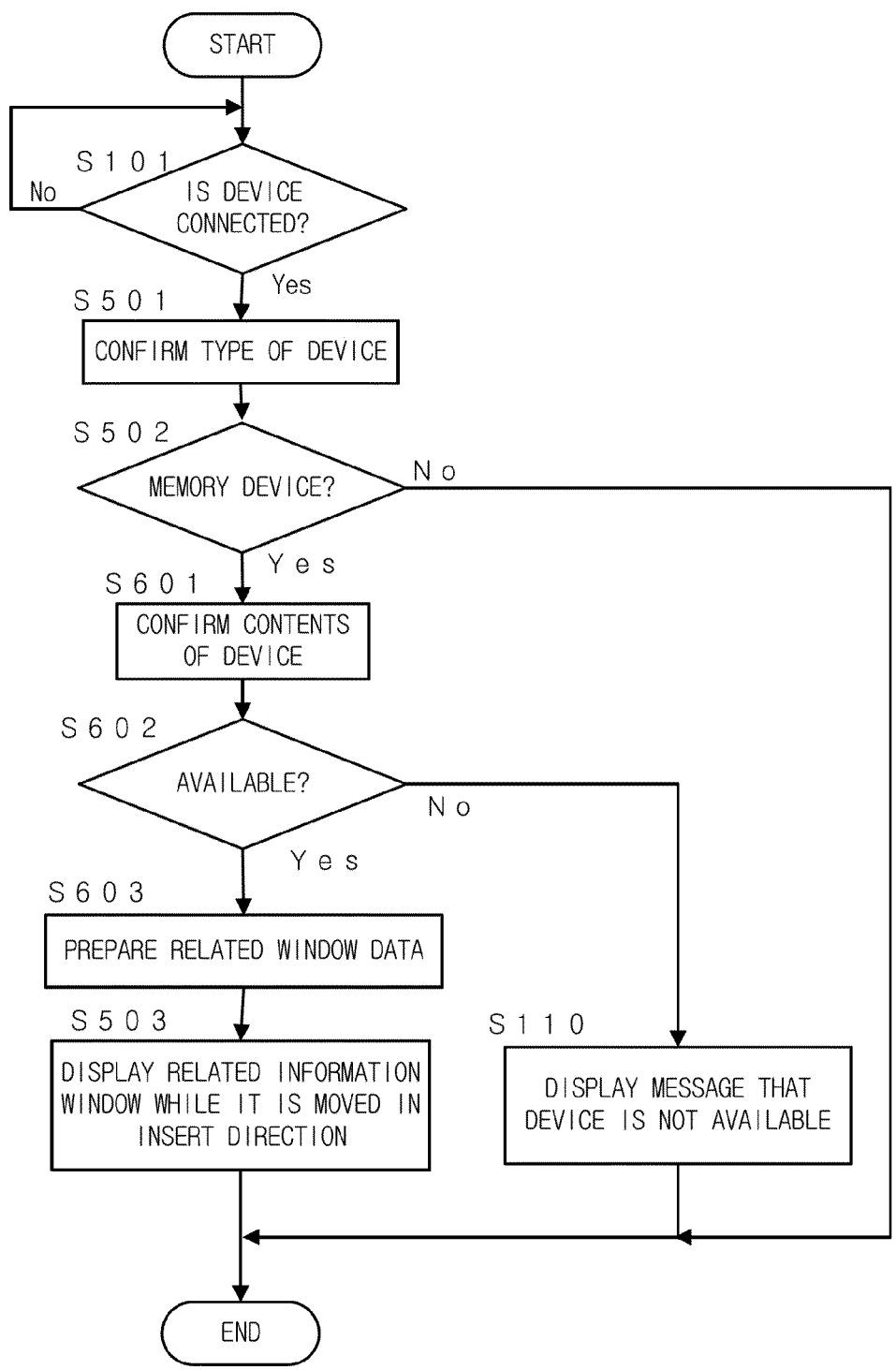
FIG. 17 is a flowchart showing the process in case that the related information window is displayed after the format of the data stored in the connected memory device is specified.
Figure 18:
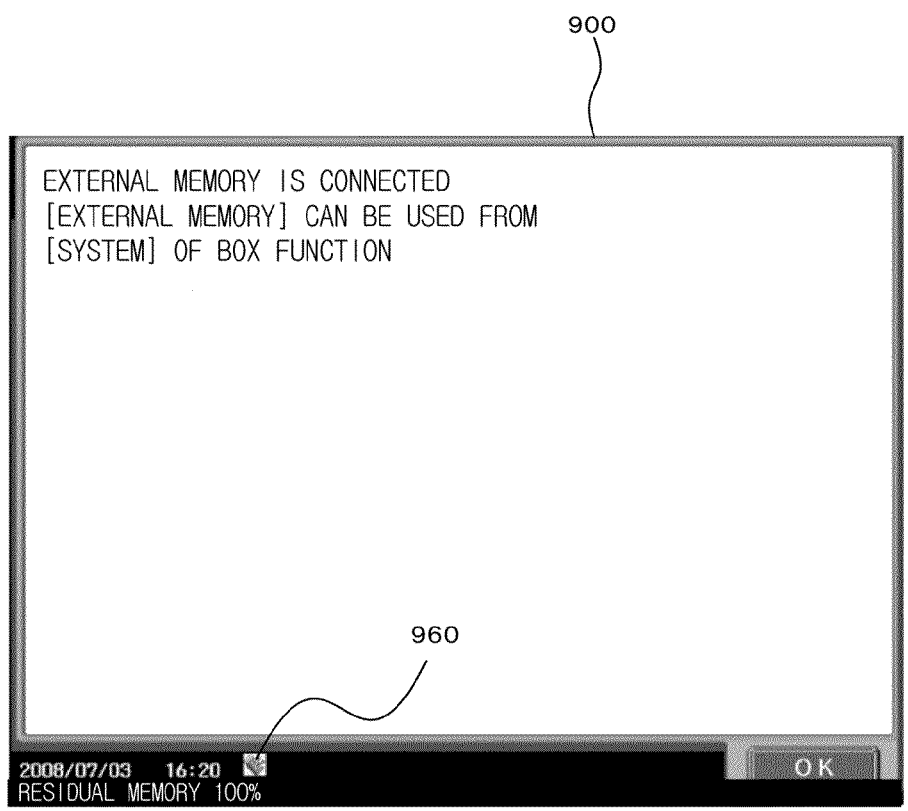
FIG. 18 is an example of the display window which is displayed when the USB memory is attached to a general image forming apparatus.
Figure 19:
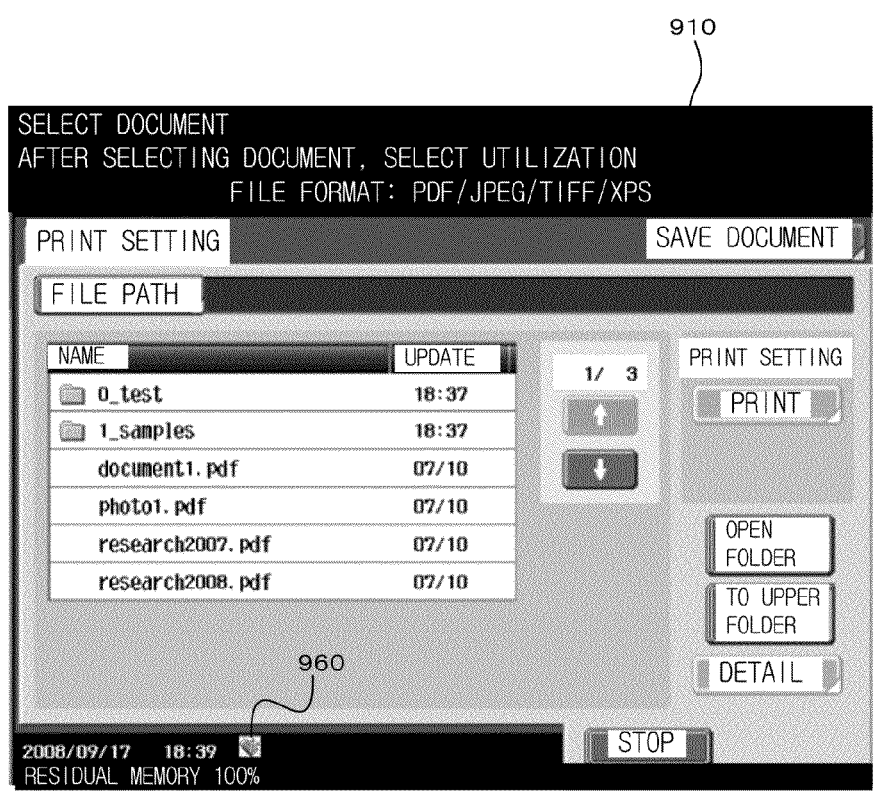
FIG. 19 is the display window showing the file list of the files stored in the USE memory which is attached to a general image forming apparatus.
Figure 20A:
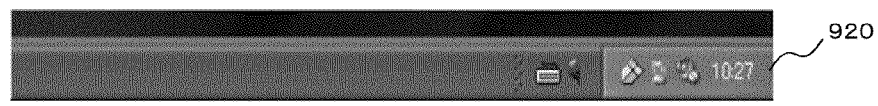
FIGS. 20A to 20C are explanatory views showing the task bar displayed in a general information processing apparatus.
Figure 20B:
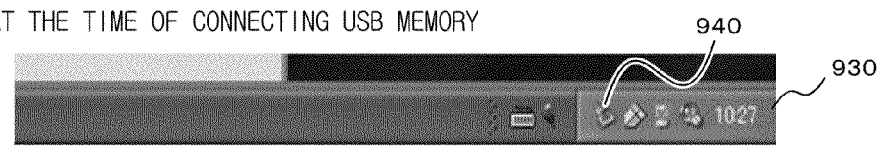
Figure 20C:

FIG. 17 shows the flowchart of the process in case that the related information window 400 is displayed after the format of the data stored in the connected memory device is specified. The steps which are the same as those in FIG. 9 and FIG. 16 are denoted by the same step numbers as FIG. 9 and FIG. 16.

In case that the device is connected to the external memory I/F unit 90 (Step S101; Yes), the CPU 10 confirms the type of the connected device (Step S501). In case that the connected device is a memory device (Step S502; Yes), the CPU 10 specifies the format of the data stored in the memory device (Step S601).

In case that the format of the data stored in the memory device is available (Step S602; Yes), the CPU 10 prepares the related window data in which the format of the data is described (the contents stored in the memory device (information display area 410)) and which is displayed in the related information window 400 (Step S603). The following process is the same as the process shown in FIG. 9. Therefore, the explanation thereof is omitted.

In the first and the second embodiments, the connection terminals, such as the external memory I/F units 90 and 92 are provided on the periphery of the liquid crystal display unit 300. That is, in the first and the second embodiments, by providing the connection terminals, such as the external memory I/F unit 90 and the like, on the periphery of the liquid crystal display unit 300, when the user carries out the insertion/withdrawal operation of the memory device for the external memory I/F unit 90 or the like, the user can view the related information window 400 corresponding to the memory device which is inserted into or withdrawn from the external memory I/F unit 90, from the liquid crystal display unit 300.

Further, even though the connection terminals, such as the external memory I/F unit 90 and the like, are not provided on the periphery of the liquid crystal display unit 300, the user can recognize the position and the direction in which the memory device is connected to the external memory I/F unit 90, according to the position of the related information window 400 or the like, after the movement of the related information window 400 or the like is finished. Preferably, the external memory I/F units 90, 92, 93 and the like are provided on the periphery of the liquid crystal display unit 300 so as to spread them.

One of the objects of the above embodiments and the like is to provide an information processing apparatus and a tangible computer-readable recording medium, for displaying the relation between the electronic device which is inserted into and withdrawn from the connection I/F unit by the user and the display contents displayed in the display window so as to be intuitively and easily recognized by the user.

In at least one of the embodiments and the like, when the control unit detects the insertion operation or the withdrawal operation of the electronic device, the control unit instructs the display unit to display the contents corresponding to the electronic device so as to move the contents in the same direction as the detected insertion operation or the detected withdrawal operation. For example, in case that the electronic device is inserted into the connection I/F unit in the left direction from the right of the connection I/F unit, the contents corresponding to the electronic device are moved from right to left on the display unit. In case that the electronic device is inserted into the connection I/F unit in the right direction from the left of the connection I/F unit, the contents corresponding to the electronic device are moved from left to right on the display unit.

In at least one of the embodiments and the like, the insertion operation is detected in accordance with one of the following three situations. The first situation is that the control unit detects that the electronic device is connected to the connection I/F unit (before the type of the electronic device is judged in accordance with the judging process for judging the type of the electronic device). The second situation is that the control unit recognizes that the electronic device connected to the connection I/F unit is an external memory. The third situation is that the control unit recognizes the type of data stored in the external memory connected to the connection I/F unit. When the control unit detects one of these situations, the control unit instructs the display unit to display the contents corresponding to the electronic device while the contents are moved in the same direction as the direction in which the electronic device is inserted into the connection I/F unit.

In at least one of the embodiments and the like, when the control unit detects the withdrawal operation, the control unit instructs the display unit to delete the contents corresponding to the electronic device withdrawn from the connection I/F unit while the contents are moved in the same direction as the direction in which the electronic device is withdrawn.

In at least one of the embodiments and the like, the control unit instructs the display unit to display the display indication indicating that the electronic device is connected to the connection I/F unit. The timing at which the display indication is displayed on the display unit is not limited. For example, the control unit may instruct the display unit to display the display indication and the contents at the same time, or to display the display indication after the movement of the contents is finished or before the contents are displayed.

In at least one of the embodiments and the like, when the control unit receives the operation for temporarily hiding the contents, the control unit instructs the display unit to delete the contents while the contents are moved and to display the corresponding indication indicating that the electronic device corresponding to the contents is connected to the connection I/F unit. In case that the contents are deleted, the control unit instructs the display unit to delete the contents while the contents are moved in the same direction as the direction in which the electronic device corresponding to the deleted contents is withdrawn from the connection I/F unit. Then, in case that the corresponding indication is selected by the user, the control unit instructs the display unit to display the contents of the electronic device corresponding to the selected corresponding indication again while the contents are moved in the same direction as the direction in which the electronic device corresponding to the corresponding indication is inserted into the connection I/F unit.

In at least one of the embodiments and the like, when the electronic device is an external memory, the control unit identifies the type of the data stored in the external memory. For example, in case that the data stored in the external memory has a data format which is available by the control unit, the control unit instructs the display unit to display the type of the data in the contents. The indication of the type of the data is not limited to the extensions of the files.

In at least one of the embodiments and the like, the connection I/F unit is provided near the display unit. Therefore, the user can insert the electronic device into the connection I/F unit and withdraw the electronic device from the connection I/F unit while the user views the display unit. Further, the electronic device which is inserted and withdrawn is easily and visually related to the contents corresponding to the electronic device and the user can easily and intuitively recognize the relation between the contents and the electronic device.

In at least one of the embodiments and the like, the control unit instructs the display unit to display the contents of which the movement is finished, by biasing the contents to the side of the display unit, which is positioned toward the direction opposite to the direction in which the electronic device is inserted (that is, the side which is positioned at a starting point of moving the contents in the insert direction of the electronic device). Therefore, the user can recognize the direction in which the electronic device is inserted, by viewing the contents after the movement of the contents is stopped.

In at least one of the embodiments and the like, the control unit instructs the display unit to move the contents corresponding to the external memory by using the slide-in/slide-out, the pop-up/close or the zoom-in/zoom-out.

In at least one of the embodiments and the like, the when the control unit detects the insertion/withdrawal operation of the electronic device, the control unit instructs the display unit to display the contents corresponding to the electronic device so as to move the contents in the direction from the position of the connection I/F unit to the display unit. For example, in case that the electronic device is inserted into the connection I/F unit provided on the right side of the display unit, the contents corresponding to the inserted electronic device is moved from right to left on the display unit. In case that the electronic device is inserted into the connection I/F unit provided on the left side of the display unit, the contents corresponding to the inserted electronic device is moved from left to right on the display unit. In those cases, the movement direction of the contents corresponding to the electronic device is determined in accordance with the position of the connection I/F unit for which the insertion/withdrawal operation of the electronic device is carried out, relative to the display unit, regardless of the direction in which the electronic device is inserted into and withdrawn from the connection I/F unit.

In at least one of the embodiments and the like, the insertion operation is detected in accordance with one of the following three situations. The first situation is that the control unit detects that the electronic device is connected to the connection I/F unit (before the type of the electronic device is judged in accordance with the judging process for judging the type of the electronic device). The second situation is that the control unit recognizes that the electronic device connected to the connection I/F unit is an external memory. The third situation is that the control unit recognizes the type of data stored in the external memory connected to the connection I/F unit. When the control unit detects one of these situations, the control unit instructs the display unit to display the contents corresponding to the electronic device connected to the connection I/F unit while the contents are moved in the direction from the position of the connection I/F unit to the display unit.

In at least one of the embodiments and the like, when the control unit detects the withdrawal operation, the control unit instructs the display unit to delete the contents corresponding to the electronic device withdrawn from the connection I/F unit while the contents are moved in the direction opposite to the direction from the position of the connection I/F unit to the display unit.

In at least one of the embodiments and the like, the control unit instructs the display unit to display the display indication indicating that the electronic device is connected to the connection I/F unit. Further, the display indication indicates the position of the connection I/F unit to which the electronic device corresponding to the display indication is connected, and the type of the connected electronic device. The timing at which the display indication is displayed on the display unit is not limited. For example, the control unit may instruct the display unit to display the display indication and the contents at the same time, or to display the display indication after the movement of the contents is finished or before the contents are displayed.

In at least one of the embodiments and the like, when the control unit receives the operation for temporarily hiding the contents, the control unit instructs the display unit to delete the contents while the contents are moved and to display the corresponding indication indicating that the electronic device corresponding to the contents is connected to the connection I/F unit. In case that the contents are deleted, the control unit instructs the display unit to delete the contents while the contents are moved in the direction opposite to the direction from the position of the connection I/F unit to the display unit.

Then, in case that the corresponding indication is selected by the user, the control unit instructs the display unit to display the contents of the electronic device corresponding to the selected corresponding indication again while the contents are moved in the direction from the position of the connection I/F into which the electronic device corresponding to the selected corresponding indication is inserted, to the display unit.

In at least one of the embodiments and the like, when the electronic device is an external memory, the control unit identifies the type of the data stored in the external memory. For example, in case that the data stored in the external memory has a data format which is available by the control unit, the control unit instructs the display unit to display the type of the data in the contents. The indication of the type of the data is not limited to the extensions of the files.

In at least one of the embodiments and the like, the connection I/F unit is provided near the display unit. Therefore, the user can insert the electronic device into the connection I/F unit and withdraw the electronic device from the connection I/F unit while the user views the display unit. Further, the electronic device which is inserted and withdrawn is easily and visually related to the contents corresponding to the electronic device and the user can easily and intuitively recognize the relation between the contents and the electronic device.

In at least one of the embodiments and the like, the control unit instructs the display unit to display the contents of which the movement is finished, by biasing the contents to the side of the display unit, which is positioned toward the direction opposite to the direction from the connection I/F unit to the display unit (that is, the side which is positioned at a starting point of the movement of the contents). Therefore, the user can recognize the position of the connection I/F unit into which the electronic device is inserted, relative to the display unit, by viewing the contents after the movement of the contents is stopped.

In at least one of the embodiments and the like, the control unit instructs the display unit to move the contents corresponding to the external memory by using the slide-in/slide-out, the pop-up/close or the zoom-in/zoom-out.

According to the information processing apparatus and the tangible computer-readable recording medium which are disclosed in the above embodiments, it is possible to display the relation between the electronic device which is inserted into and withdrawn from the connection I/F unit by the user and the contents displayed in the display window so as to be intuitively and easily recognized by the user.

What is claimed is:
1. An information processing apparatus comprising:
a display unit;
a connection I/F unit to receive a connection to a withdrawable electronic device; and
a control unit to detect an insertion operation in which the electronic device is inserted into the connection I/F unit by a user or a withdrawal operation in which the electronic device is withdrawn from the connection I/F unit by the user;
wherein the control unit carries out at least one display of an insertion display and a withdrawal display,
wherein in the insertion display, when the control unit detects the insertion operation, the control unit instructs the display unit to display contents corresponding to the electronic device connected to the connection I/F unit by the insertion operation so as to move the contents in a direction which is same as a direction of the detected insertion operation, and in the withdrawal display, when the control unit detects the withdrawal operation, the control unit instructs the display unit to display the contents corresponding to the electronic device withdrawn from the connection I/F unit by the withdrawal operation so as to move the contents in a direction which is same as a direction of the detected withdrawal operation, wherein when the control unit receives an operation for temporarily hiding the contents having been displayed on the display unit, the control unit instructs the display unit to delete the contents to be hidden by the operation while the contents to be hidden are moved in a same direction as a direction in which the electronic device corresponding to the contents to be hidden is withdrawn from the connection I/F unit and instructs the display unit to display a corresponding indicator indicating a direction in which the electronic device corresponding to the contents to be hidden is connected to the connection I/F unit and a type of the electronic device, and when the control unit detects an operation for the corresponding indicator, the control unit instructs the display unit to display the contents of the electronic device corresponding to the operated corresponding indicator again while the contents are moved in a same direction as a direction in which the electronic device corresponding to the corresponding indicator is inserted into the connection I/F unit.

2. The information processing apparatus of claim 1, wherein the control unit detects the insertion operation by one of detecting that the electronic device is connected to the connection I/F unit, recognizing that the electronic device connected to the connection I/F unit is an external memory, and recognizing a type of data stored in the external memory connected to the connection I/F unit.

3. The information processing apparatus of claim 1, wherein when the control unit detects the withdrawal operation, the control unit instructs the display unit to delete the contents corresponding to the electronic device withdrawn from the connection I/F unit by the withdrawal operation while the contents are moved in a same direction as a direction in which the electronic device is withdrawn from the connection I/F unit.

4. The information processing apparatus of claim 1, wherein the control unit instructs the display unit to display a display indicator indicating a direction in which the electronic device is connected to the connection I/F unit, and the type of the electronic device, with the contents.

5. The information processing apparatus of claim 1, wherein when the electronic device is an external memory, the control unit instructs the display unit to display a type of data stored in the external memory, in the contents corresponding to the external memory.

6. The information processing apparatus of claim 1, wherein the connection I/F unit is provided near the display unit.

7. The information processing apparatus of claim 1, wherein after a movement of the contents, which is caused by the insertion operation is finished, the control unit instructs the display unit to display the contents by biasing the contents so that the contents contact to a side of the display unit, which is positioned at a starting point of moving the contents in a direction in which the electronic device is inserted into the connection I/F unit.

8. The information processing apparatus of claim 1, wherein when the control unit detects the insertion operation, the control unit instructs the display unit to move the contents corresponding to the electronic device so as to slide the contents in a screen of the display unit, and when the control unit detects the withdrawal operation, the control unit instructs the display unit to move the contents so as to slide the contents out of the screen, or when the control unit detects the insertion operation, the control unit instructs the display unit to display the contents by a pop-up, and when the control unit detects the withdrawal operation, the control unit instructs the display unit to close the contents while the contents are moved, or when the control unit detects the insertion operation, the control unit instructs the display unit to move the contents by zooming in the contents, and when the control unit detects the withdrawal operation, the control unit instructs the display unit to move the contents by zooming out the contents.

9. The information processing apparatus of claim 1, wherein when the control unit detects the insertion operation of a plurality of types of electronic devices, the control unit instructs the display unit to display the contents corresponding to each type of the electronic devices and indicating a direction in which the electronic device corresponding to the displayed contents is connected to the connection I/F unit.

10. The information processing apparatus of claim 9, wherein the contents include a picture indicator indicating the direction in which the electronic device is connected to the connection I/F unit, and the type of the electronic device.

11. A non-transitory computer-readable recording medium storing a program, wherein the program causes a computer comprising a connection I/F unit to receive a connection to an electronic device which is inserted and withdrawn by a user and a display unit, to execute:

detecting an insertion operation in which the electronic device is inserted into the connection I/F unit or a withdrawal operation in which the electronic device is withdrawn from the connection I/F unit by the user; and carrying out at least one display of an insertion display and a withdrawal display, wherein in the insertion display, when detecting the insertion operation, instructing the display unit to display contents corresponding to the electronic device connected to the connection I/F unit by the insertion operation so as to move the contents in a direction which is same as a direction of the detected insertion operation, and in the withdrawal display, when detecting the withdrawal operation, instructing the display unit to display the contents corresponding to the electronic device withdrawn from the connection I/F unit by the withdrawal operation so as to move the contents in a direction which is same as a direction of the detected withdrawal operation, wherein when receiving an operation for temporarily hiding the contents having been displayed on the display unit, instructing the display unit to delete the contents to be hidden by the operation while the contents to be hidden are moved in a same direction as a direction in which the electronic device corresponding to the contents to be hidden is withdrawn from the connection I/F unit and instructing the display unit to display a corresponding indicator indicating a direction in which the electronic device corresponding to the contents to be hidden is connected to the connection I/F unit and a type of the electronic device, and when receiving an operation for the corresponding indicator, instructing the display unit to display the contents of the electronic device corresponding to the operated corresponding indication again while the contents are moved in a same direction as a direction in which the electronic device corresponding to the corresponding indicator is inserted into the connection I/F unit.

12. An information processing apparatus comprising:
a display unit;
a connection I/F unit to receive a connection to a withdrawable electronic device; and
a control unit to detect an insertion operation in which the electronic device is inserted into the connection I/F unit by a user or a withdrawal operation in which the electronic device is withdrawn from the connection I/F unit by the user;
wherein the control unit carries out at least one display of an insertion display and a withdrawal display, wherein in the insertion display, when the control unit detects the insertion operation, the control unit instructs the display unit to display contents corresponding to the electronic device connected to the connection I/F unit by the insertion operation so as to move the contents in a direction from a position of the connection I/F unit in which the insertion operation is detected, to the display unit, and
in the withdrawal display, when the control unit detects the withdrawal operation, the control unit instructs the display unit to display the contents corresponding to the electronic device withdrawn from the connection I/F unit by the withdrawal operation so as to move the contents in a direction opposite to the direction from the position of the connection I/F unit in which the withdrawal operation is detected, to the display unit,
wherein when the control unit receives an operation for temporarily hiding the contents having been displayed on the display unit, the control unit instructs the display unit to delete the contents to be hidden by the operation while the contents to be hidden are moved in the direction opposite to the direction from the position of the connection I/F unit to which the electronic device corresponding to the contents to be hidden is connected, to the display unit and instructs the display unit to display a corresponding indicator indicating a position of the electronic device corresponding to the contents to be hidden and connected to the connection I/F unit and a type of the electronic device, and
when the control unit detects an operation for the corresponding indicator, the control unit instructs the display unit to display the contents of the electronic device corresponding to the operated corresponding indicator again while the contents are moved in the direction from the position of the connection I/F unit into which the electronic device corresponding to the corresponding indicator is inserted, to the display unit.

13. The information processing apparatus of claim 12, wherein the control unit detects the insertion operation by one of detecting that the electronic device is connected to the connection I/F unit, recognizing that the electronic device connected to the connection I/F unit is an external memory, and recognizing a type of data stored in the external memory connected to the connection I/F unit.

14. The information processing apparatus of claim 12, wherein when the control unit detects the withdrawal operation, the control unit instructs the display unit to delete the contents corresponding to the electronic device withdrawn from the connection I/F unit by the withdrawal operation while the contents are moved in the direction opposite to the direction from the position of the connection I/F unit in which the withdrawal operation is detected, to the display unit.

15. The information processing apparatus of claim 12, wherein the control unit instructs the display unit to display a display indicator indicating a position in which the electronic device is connected to the connection I/F unit and the type of the electronic device, with the contents.

16. The information processing apparatus of claim 12, wherein when the electronic device is an external memory, the control unit instructs the display unit to display a type of data stored in the external memory, in the contents corresponding to the external memory.

17. The information processing apparatus of claim 12, wherein the connection I/F unit is provided near the display unit.

18. The information processing apparatus of claim 12, wherein after a movement of the contents, which is caused by the insertion operation is finished, the control unit instructs the display unit to display the contents by biasing the contents so that the contents contact to a side of the display unit, which is positioned at a starting point of the movement of the contents.

19. The information processing apparatus of claim 12, wherein when the control unit detects the insertion operation, the control unit instructs the display unit to move the contents corresponding to the electronic device so as to slide the contents in a screen of the display unit, and when the control unit detects the withdrawal operation, the control unit instructs the display unit to move the contents so as to slide the contents out of the screen, or
when the control unit detects the insertion operation, the control unit instructs the display unit to display the contents by a pop-up, and when the control unit detects the withdrawal operation, the control unit instructs the display unit to close the contents while the contents are moved, or
when the control unit detects the insertion operation, the control unit instructs the display unit to move the contents by zooming in the contents, and when the control unit detects the withdrawal operation, the control unit instructs the display unit to move the contents by zooming out the contents.

20. The information processing apparatus of claim 12, wherein when the control unit detects the insertion operation of a plurality of types of electronic devices, the control unit instructs the display unit to display the contents corresponding to each type of the electronic devices and indicating a position in which the electronic device corresponding to the displayed contents is connected to the connection I/F unit.

21. The information processing apparatus of claim 20, wherein the contents include a picture indicator indicating the position in which the electronic device is connected to the connection I/F unit, and the type of the electronic device.

22. A non-transitory computer-readable recording medium storing a program,
wherein the program causes a computer comprising a connection I/F unit to receive a connection to an electronic device which is inserted and withdrawn by a user and a display unit, to execute:
detecting an insertion operation in which the electronic device is inserted into the connection I/F unit or a withdrawal operation in which the electronic device is withdrawn from the connection I/F unit by the user; and
carrying out at least one display of an insertion display and a withdrawal display, wherein in the insertion display, when detecting the insertion operation, instructing the display unit to display contents corresponding to the electronic device connected to the connection I/F unit by the insertion operation so as to move the contents in a direction from a position of the connection I/F unit in which the insertion operation is detected, to the display unit, and in the withdrawal display, when detecting the withdrawal operation, instructing the display unit to display the contents corresponding to the electronic device withdrawn from the connection I/F unit by the withdrawal operation so as to move the contents in a direction opposite to the direction from the position of the connection I/F unit in which the withdrawal operation is detected, to the display unit, wherein when receiving an operation for temporarily hiding the contents being displayed on the display unit, instructing the display unit to delete the contents to be hidden by the operation while the contents to be hidden are moved in the direction opposite to the direction from the position of the connection I/F unit to which the electronic device corresponding to the contents to be hidden is connected, to the display unit and instructing the display unit to display a corresponding indicator indicating a position of the electronic device corresponding to the contents to be hidden and connected to the connection I/F unit and a type of the electronic device, and when receiving an operation for the corresponding indicator, instructing the display unit to display the contents of the electronic device corresponding to the operated corresponding indicator again while the contents are moved in the direction from the position of the connection I/F unit into which the electronic device corresponding to the corresponding indicator is inserted, to the display unit.

\* \* \* \* \*